(12) United States Patent
Ochi

(10) Patent No.: US 9,158,490 B2
(45) Date of Patent: Oct. 13, 2015

(54) IMAGE FORMING SYSTEM AND APPARATUS USABLE WITH THE INTERNET IN A CLOUD PRINTING ARRANGEMENT

(71) Applicant: Oki Data Corporation, Tokyo (JP)

(72) Inventor: Kengo Ochi, Tokyo (JP)

(73) Assignee: OKI DATA CORPORATION, Tokyo (JP)

( * ) Notice: Subject to any disclaimer, the term of this patent is extended or adjusted under 35 U.S.C. 154(b) by 0 days.

(21) Appl. No.: 14/496,061

(22) Filed: Sep. 25, 2014

(65) Prior Publication Data

US 2015/0092221 A1    Apr. 2, 2015

(30) Foreign Application Priority Data

Sep. 27, 2013    (JP) .................. 2013-201859

(51) Int. Cl.
*G06F 15/00* (2006.01)
*G06K 1/00* (2006.01)
*G06K 15/00* (2006.01)
*G06F 3/12* (2006.01)

(52) U.S. Cl.
CPC .............. *G06F 3/126* (2013.01); *G06F 3/1204* (2013.01); *G06F 3/1206* (2013.01); *G06F 3/1222* (2013.01); *G06F 3/1238* (2013.01); *G06F 3/1261* (2013.01); *G06F 3/1287* (2013.01); *G06F 3/1288* (2013.01)

(58) Field of Classification Search
CPC ..... G06F 3/126; G06F 3/1204; G06F 3/1206; G06F 3/1261; G06F 3/1288; G06F 3/1222; G06F 3/1238; G06F 3/1287

USPC ......................... 358/1.14, 1.15, 1.1
See application file for complete search history.

(56) References Cited

U.S. PATENT DOCUMENTS

| | | | |
|---|---|---|---|
| 8,599,402 B2 * | 12/2013 | Iwasaki | 358/1.14 |
| 2007/0146768 A1 | 6/2007 | Isoda | |
| 2012/0236359 A1 * | 9/2012 | Mihara | 358/1.15 |
| 2013/0044343 A1 | 2/2013 | Matsugashita | |

FOREIGN PATENT DOCUMENTS

| | | |
|---|---|---|
| EP | 2372525 A2 | 10/2011 |
| JP | 2008-146465 A | 6/2008 |

* cited by examiner

*Primary Examiner* — Douglas Tran
(74) *Attorney, Agent, or Firm* — Rabin & Berdo, P.C.

(57) ABSTRACT

An image forming system includes a server, a first image forming apparatus, and a second image forming apparatus. The server includes: a registration unit that stores identification information for the first image forming apparatus in the first memory; a job obtaining unit that obtains a print job; and a job transmission unit that, upon receiving a request including the identification information stored in the first memory, transmits the print job. The first image forming apparatus includes: a second memory that stores the identification information; and a first job reception unit that transmits the request including the identification information stored in the second memory to the server and receives the print job. The second image forming apparatus includes: an identification information obtaining unit that obtains the identification information; and a second job reception unit that transmits the request including the obtained identification information to the server and receives the print job.

11 Claims, 17 Drawing Sheets

40A(40B)

42A(42B)

IMAGE FORMING SYSTEM AND APPARATUS USABLE WITH THE INTERNET IN A CLOUD PRINTING ARRANGEMENT

BACKGROUND OF THE INVENTION

1. Field of the Invention

The present invention relates to an image forming system and an image forming apparatus.

2. Description of the Related Art

A print system has been proposed in which a client sends a print job to a server via the Internet, the server sends the print job to a printer via the Internet, and the printer performs printing based on the print job (for example, see Japanese Patent Application Publication No. 2008-146465).

In the print system, plural printers may be connected to the server and receive print jobs from the server to print them.

SUMMARY OF THE INVENTION

An aspect of the present invention is intended to improve the convenience of an image forming system.

According to an aspect of the present invention, there is provided an image forming system including a server, a first image forming apparatus, and a second image forming apparatus. The server includes: a first memory; a registration unit that registers the first image forming apparatus with the server by storing identification information for identifying the first image forming apparatus in the first memory; a job obtaining unit that obtains a print job for the first image forming apparatus; and a job transmission unit that, upon receiving a request including the identification information stored in the first memory, transmits the print job obtained by the job obtaining unit to a source of the request. The first image forming apparatus includes: a second memory that stores the identification information for identifying the first image forming apparatus; and a first job reception unit that transmits the request including the identification information stored in the second memory to the server and receives the print job transmitted from the server in response to the request. The second image forming apparatus includes: an identification information obtaining unit that obtains the identification information for identifying the first image forming apparatus; and a second job reception unit that transmits the request including the identification information obtained by the identification information obtaining unit to the server and receives the print job transmitted from the server in response to the request.

According to another aspect of the present invention, there is provided an image forming apparatus including: an identification information obtaining unit that obtains identification information for identifying another image forming apparatus other than the image forming apparatus; and a job reception unit that transmits a request including the identification information obtained by the identification information obtaining unit to a server, and receives a print job for the other image forming apparatus identified by the identification information from the server.

Further scope of applicability of the present invention will become apparent from the detailed description given hereinafter. However, it should be understood that the detailed description and specific embodiments, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

Embodiments of the invention will now be described with reference to the attached drawings.

<1. First Embodiment>
<1-1. Configuration of Cloud Print System>

Figure 1:
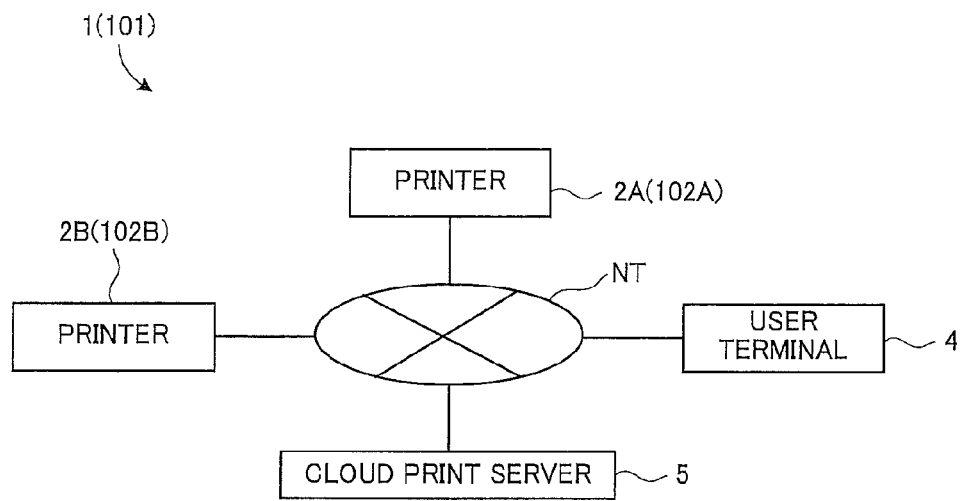
FIG. 1 is a schematic block diagram illustrating a configuration of a cloud print system.

FIG. 1 illustrates a cloud print system 1 as an image forming system in the first embodiment. In FIG. 1, the cloud print system 1 includes a printer 2A, a printer 2B, a cloud print server (or print server) 5, and a user terminal 4 as a client of the cloud print server 5, which are connected to each other via the Internet NT. Hereinafter, when the printers 2A and 2B need not be distinguished from each other, each of them will be referred to as a printer 2. In the cloud print system 1, a client (e.g., the user terminal 4) sends a print job to the cloud print server 5, which sends the print job to a printer 2, which prints the print job.

The cloud print server 5 provides, when a printer 2 is registered with the cloud print server 5, a cloud print service of receiving and storing a print job for the printer 2 and transmitting the stored print job to the printer 2. Specifically, when a printer 2 is registered with the cloud print server 5, the cloud print server 5 receives a print job for the printer 2 from the user terminal 4, stores the received print job, and transmits the stored print job to the printer 2. More specifically, the cloud print server 5 receives, from the user terminal 4 via the Internet NT, a print job with designation of a destination of the print job, stores the received print job, and transmits the stored print job via the Internet NT to the designated destination; a printer 2 can be designated as the destination if it is registered with the cloud print server 5, but a printer 2 cannot be designated as the destination if it is not registered with the cloud print server 5. Thus, the cloud print server 5 places a printer 2 in a state in which the printer 2 can be designated as the destination, by registering the printer 2 with the cloud print server 5. In this embodiment, the cloud print server 5 registers a printer 2 by storing or registering identification information for identifying the printer 2 in a predetermined memory. The cloud print server 5 makes a printer 2 available in the cloud print system 1 by registering identification information unique to the printer 2 with the cloud print server 5 and transmitting to the printer 2 the identification information, which is stored in the printer 2. The cloud print server 5 makes the printer 2 unavailable in the cloud print system 1 by deleting the identification information for the printer 2 from the cloud print server 5. The cloud print service is a service that allows the user terminal 4 to print a print job at the printers 2A and 2B by using the cloud print server 5. The cloud print server 5 may receive image data from the user terminal 4 and generate a print job including the image data.

The user terminal 4 is a notebook PC (Personal Computer), a mobile terminal, or other devices easy to carry. The user terminal 4 is operated by a user to transmit a print job to the cloud print server 5 while designating, as a destination of the print job, a printer 2 registered with the cloud print server 5.

The cloud print server 5, printer 2A, and printer 2B have host names "print.cloud.com", "printer1.example.com", and "printer2.example.com" assigned to them, respectively.

When the printer ID for the printer 2A (or 2B) is registered with the cloud print server 5, the cloud print server 5 receives a print job for the printer 2A (or 2B) from the user terminal 4 and stores the print job therein.

The printer 2A (or 2B) acquires a print job for the printer 2A (or 2B) from the cloud print server 5 by using the printer ID for the printer 2A (or 2B) stored in the printer 2A (or 2B), and performs printing based on the acquired print job (i.e., prints the print job).

The printer 2B is configured to acquire a print job for the printer 2A from the cloud print server 5 and performs printing based on the acquired print job. Such printing will be referred to as "substitute printing". Specifically, the printer 2B is configured to obtain the printer ID for the printer 2A, acquire a print job for the printer 2A from the cloud print server 5 by using the obtained printer ID, and perform substitute printing based on the print job. The printer 2B may obtain the printer ID for the printer 2A via the user terminal 4.

<1-2. Configuration of Cloud Print Server>

Figure 2:
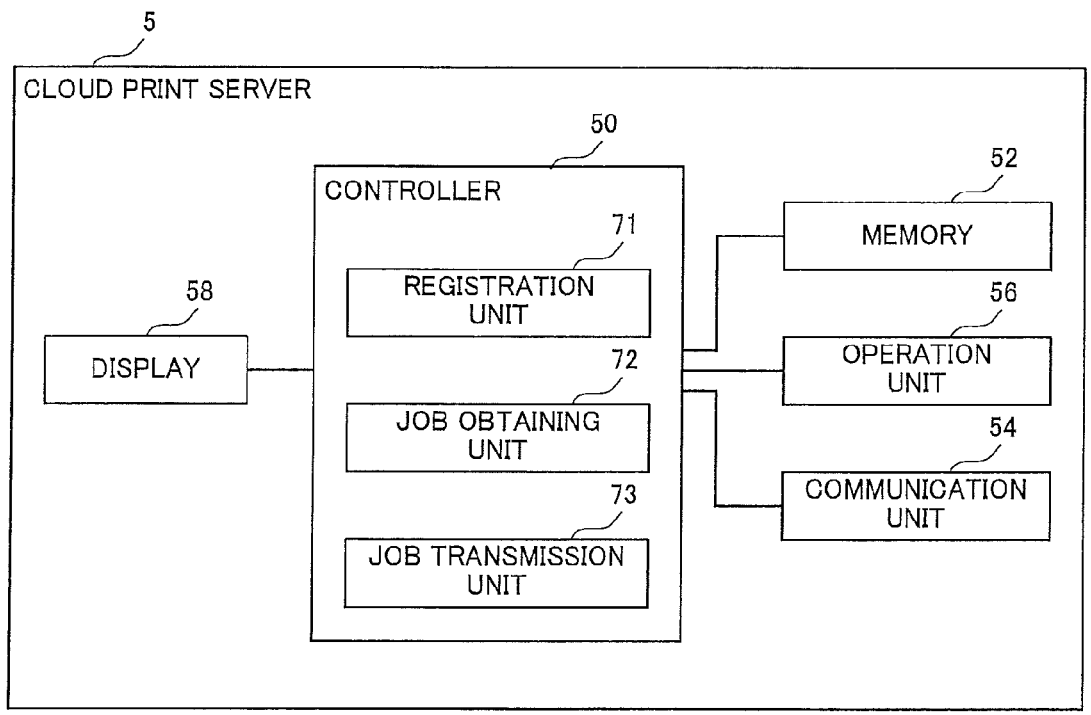
FIG. 2 is a schematic block diagram illustrating a configuration of a cloud print server.

As shown in FIG. 2, the cloud print server 5 includes a controller 50, a memory 52, a communication unit 54, an operation unit 56, and a display 58. The controller 50 controls respective units, such as the memory 52, communication unit 54, operation unit 56, and display 58, in the cloud print server 5. The controller 50 is based around a CPU (Central Processing Unit) (not shown). The controller 50 reads predetermined programs from the memory 52 and executes them, thereby controlling the respective units to perform various processes. The memory 52 may include a ROM (Read Only Memory), a RAM (Random Access Memory), a hard disc drive, a flash memory, or the like.

The communication unit 54 transmits and receives data to and from the printer 2A, printer 2B, and user terminal 4 via the Internet NT.

The operation unit 56 includes, for example, a keyboard and a mouse, and receives operation instructions from an operator. The display 58 includes, for example, an LCD (Liquid Crystal Display), and displays image data output from the controller 50.

The controller 50 includes a registration unit 71, a job obtaining unit 72, and a job transmission unit 73.

The registration unit 71 registers a printer 2 with the cloud print server 5 by storing a printer ID for the printer 2, which is identification information for identifying the printer 2, in the memory 52. Specifically, when the registration unit 71 receives a request to register a printer 2, it generates a printer ID for the printer 2, stores the generated printer ID in the memory 52 to register the printer 2 with the cloud print server 5, and transmits the generated printer ID to the printer 2, which receives the printer ID from the registration unit 71 and stores the received printer ID therein. More specifically, upon receiving an identification information registration request from a printer 2 via the communication unit 54, the registration unit 71 generates or issues a printer ID for the printer 2; it registers, in a cloud printer list in the memory 52, the printer ID and an account for an administrator of the printer 2 to which the printer ID is assigned in association with each other; it transmits the printer ID to the printer 2 via the communication unit 54. In the cloud printer list, for each printer available in the cloud print system 1, one printer ID for the printer is registered in association with the account for one administrator of the printer.

The registration unit 71 removes the registration of a printer 2 from the cloud print server 5 by deleting the printer ID for the printer 2 from the memory 52. Specifically, when the registration unit 72 receives an identification information deletion request from a printer 2 via the communication unit 54, it deletes the printer ID for the printer 2 from the cloud printer list.

The job obtaining unit 72 obtains a print job for a printer 2 registered with the cloud print server 5. Specifically, upon receiving designation of a printer 2 registered with the cloud print server 5 and image data, the job obtaining unit 72 generates a print job for the designated printer 2 including the designated image data. The job obtaining unit 72 stores the obtained or generated print job for the printer 2 in a print job queue for the printer 2 in the memory 52.

For each printer ID registered with the cloud printer list, the memory 52 stores a print job queue for storing print jobs to be printed at the printer to which the printer ID is assigned.

When the job transmission unit 73 receives a request (referred to below as a print job acquisition request) including a printer ID stored in the memory 52, if a print job for the printer 2 identified by the printer ID (or a print job associated with the printer ID) is stored in the memory 52, the job transmission unit 73 transmits the print job for the printer 2 to the source of the print job acquisition request.

<1-3. Configuration of Printer 2A>

Figure 3:
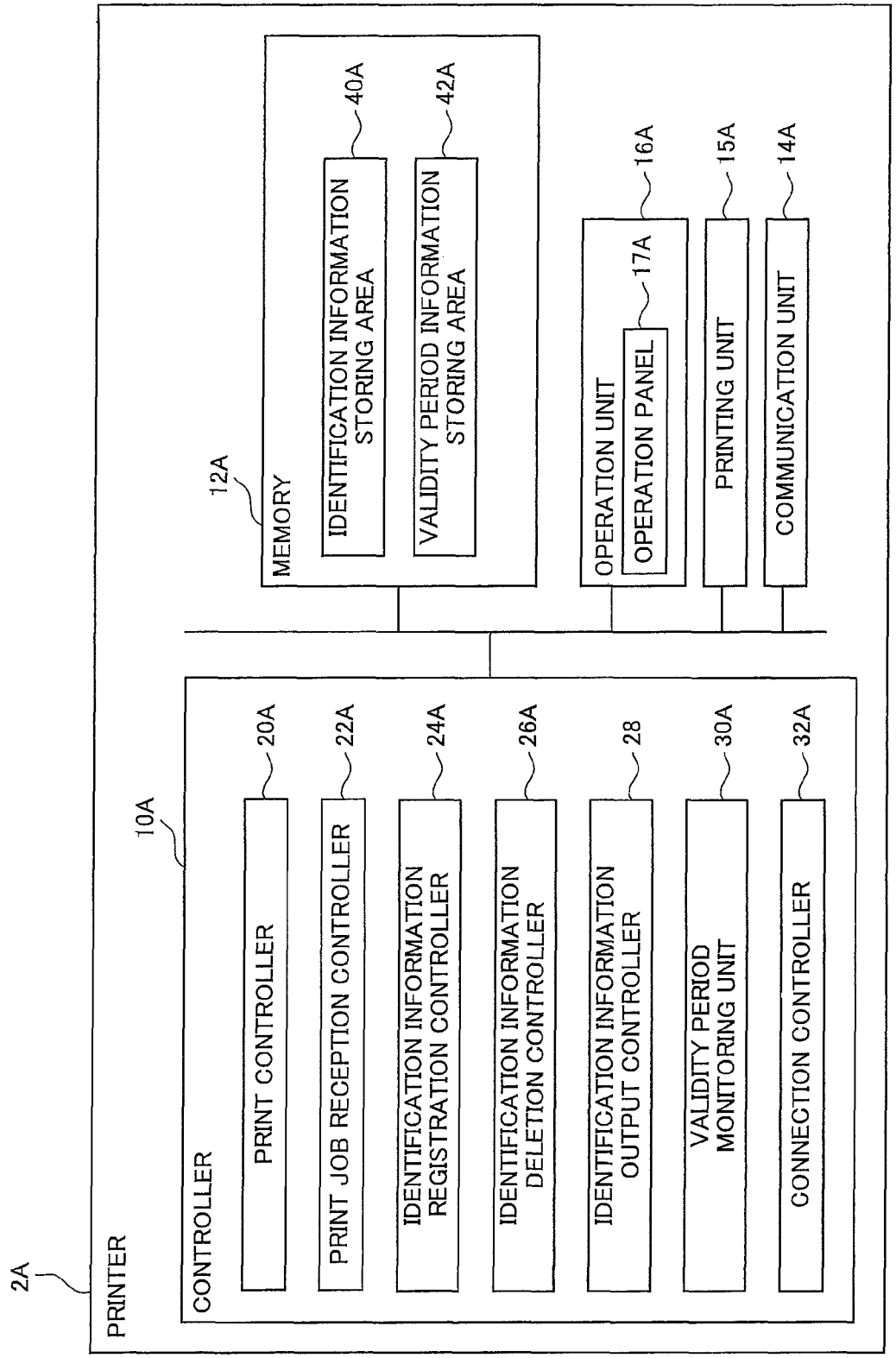
FIG. 3 is a schematic block diagram illustrating a configuration of a printer 2A in a first embodiment.

As shown in FIG. 3, the printer 2A includes a controller 10A, a memory 12A, a communication unit 14A, a printing unit 15A, and an operation unit (or user interface) 16A. The controller 10A controls respective units, such as the memory 12A, communication unit 14A, printing unit 15A, and operation unit 16A, in the printer 2A. The controller 10A is based around a CPU (not shown). The controller 10A reads predetermined programs from the memory 12A and executes them, thereby controlling the respective units to perform various processes, such as a printing process. The memory 12A may include a ROM, a RAM, a hard disc drive, a flash memory, or the like.

The communication unit 14A transmits and receives data to and from the printer 2B, user terminal 4, and cloud print server 5 via the Internet NT. The communication unit 14A receives a print job from the cloud print server 5. The printing unit 15A prints the print job received by the communication unit 14.

The operation unit 16A includes an operation panel 17A and operation keys (not shown). The operation panel 17A includes an LCD and a touch panel, which are integrally formed. The LCD displays screens, such as various setting screens, under control of the controller 10A. The touch panel receives selection regarding various setting items on the setting screens. The operation keys include a copy screen display key, a print screen display key, a scan screen display key, a facsimile screen display key, a start key, a stop/clear key, a power supply key, numeric keys, and the like. The operation unit 16A outputs operation instructions to the controller 10A in response to operation of the operation panel 17A or operation keys.

Figure 4:
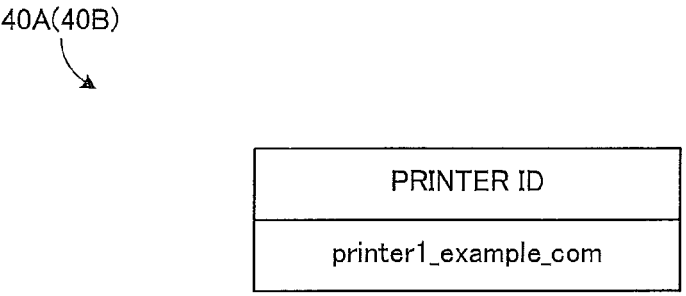
FIG. 4 illustrates an identification information storing area.

The memory 12A includes an identification information storing area 40A. As shown in FIG. 4, the identification information storing area 40A stores a printer ID as a unique identification information identifying the printer 2A in the cloud print system 1. The printer 2A obtains the printer ID from the cloud print server 5 in order to use the cloud print service and stores the obtained printer ID in the identification information storing area 40A. In this embodiment, as the printer ID for the printer 2A, a string "printer1_example_com" is stored in the identification information storing area 40A.

Figure 5:
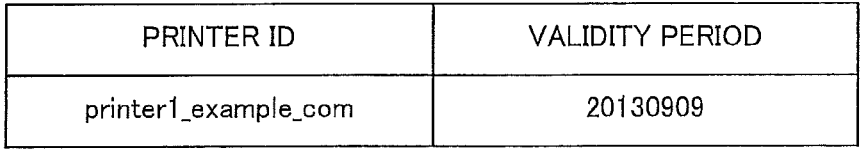
FIG. 5 illustrates a validity period information storing area.

The memory 12A further includes a validity period information storing area 42A. As shown in FIG. 5, the validity period information storing area 42A stores the printer ID and validity period information in association with each other. The validity period information is set and stored when the printer ID is used by another printer (e.g., printer 2B). The validity period information indicates a validity period during which the printer ID can be validly used by another printer. For example, the validity period information indicates the end time of the validity period. In FIG. 5, the validity period information is set to "20130909", which indicates Sep. 9, 2013 as the end time of the validity period. Thus, the validity period information in this embodiment indicates that the printer ID "printer1_example_com" can be validly used by another printer until Sep. 9, 2013.

The controller 10A includes a print controller 20A, a print job reception controller 22A, an identification information registration controller 24A, an identification information deletion controller 26A, an identification information output controller 28, a validity period monitoring unit 30A, and a connection controller 32A.

The print controller 20A prints print data, which is data to be actually printed, included in a print job received from the cloud print server 5 via the Internet NT on a print medium such as a sheet of paper. Specifically, the print controller 20A controls the printing unit 15A to print the print data.

The print job reception controller 22A acquires a print job from the cloud print server 5. Specifically, the print job reception controller 22A transmits a print job acquisition request including the printer ID stored in the identification information storing area 40A to the cloud print server 5, and receives a print job transmitted from the cloud print server 5 in response to the print job acquisition request. The print job reception controller 22A supplies the received print job to the print controller 20A, causing it to print the print job.

Before the use of the cloud print service, in accordance with operation of the operation panel 17A by a user or the like, the identification information registration controller 24A transmits an identification information registration request to the cloud print server 5, thereby causing the cloud print server 5 to register a printer ID for the printer 2A in the cloud print server 5.

When the use of the cloud print service is stopped, in accordance with operation of the operation panel 17A by a user or the like, the identification information deletion controller 26A transmits an identification information deletion request to the cloud print server 5, thereby causing the cloud print server 5 to delete the printer ID for the printer 2A from the cloud print server 5.

The identification information output controller 28 outputs the printer ID stored in the identification information storing area 40A to the outside (e.g., external device) of the printer 2A. In this embodiment, the identification information output controller 28 outputs the printer ID together with validity period information indicating a validity period. For example, the identification information output controller 28 sets a validity period of the printer ID, stores validity period information indicating the set validity period in the validity period information storing area 42A, and provides the user terminal 4 with the printer ID for the printer 2A and the validity period information of the printer ID. The output printer ID may be used for substitute printing by the printer 2B.

The validity period monitoring unit 30A restricts the reception of the print job by the print job reception controller 22A after the output of the printer ID by the identification information output controller 28. For example, when the identification information output controller 28 outputs the printer ID, the validity period monitoring unit 30A puts the printer 2A into a state where the printer 2A cannot acquire a print job for the printer 2A from the cloud print server 5. The validity period monitoring unit 30A removes the restriction of the reception of the print job by the print job reception controller 22A after the lapse of the validity period. For example, the validity period monitoring unit 30A determines whether the validity period has elapsed; when it is determined that the validity period has elapsed, the validity period monitoring unit 30A puts the printer 2A into a state where the printer 2A can acquire a print job for the printer 2A from the cloud print server 5. More specifically, the validity period monitoring unit 30A monitors the validity period of the printer ID stored in the identification information storing area 40A based on the validity period information in the validity period information storing area 42A; it invalidates the printer ID for the printer 2A in the printer 2A when the printer ID is output to the user terminal 4; it validates the printer ID for the printer 2A in the printer 2A after the validity period has elapsed. Thus, after the printer ID is output, the printer ID is temporarily invalid in the printer 2A until the validity period has elapsed.

The connection controller 32A establishes or disconnects a persistent connection between the print job reception controller 22A of the printer 2A and the controller 50 of the cloud print server 5. In the persistent connection state, the print job reception controller 22A and the controller 50 are connected by using XMPP (Extensible Messaging and Presence Protocol), which is an XML (Extensible Markup Language) based protocol.

<1-4. Configuration of Printer 2B>

Figure 6:
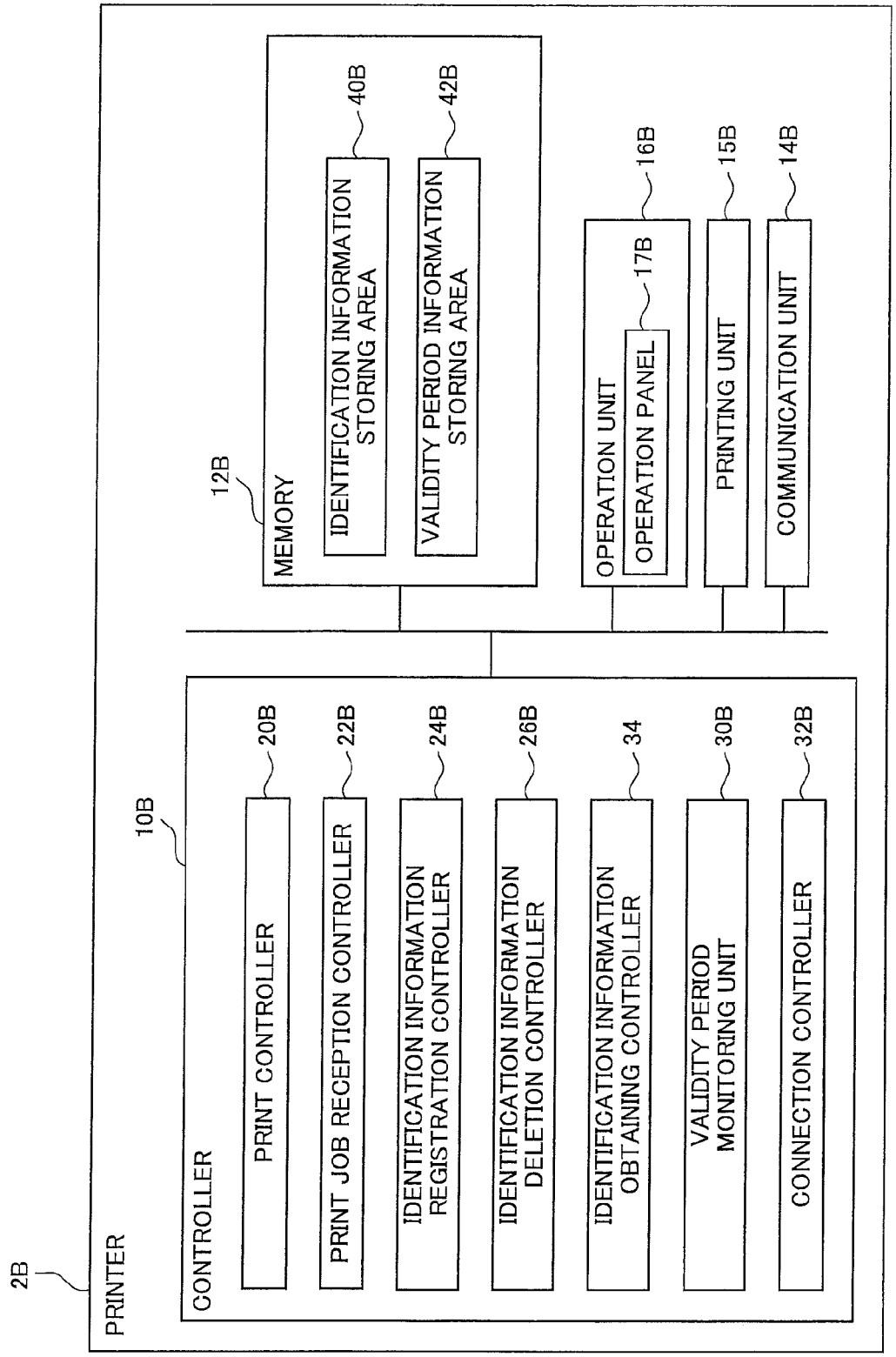
FIG. 6 is a schematic block diagram illustrating a configuration of a printer 2B in the first embodiment.

As shown in FIG. 6, the configuration of the printer 2B is substantially the same as that of the printer 2A shown in FIG. 3. Thus, the following description will mainly focus on differences from the printer 2A.

The printer 2B includes a controller 10B, a memory 12B, a communication unit 14B, a printing unit 15B, and an operation unit (or user interface) 16B.

The communication unit 14B transmits and receives data to and from the printer 2A, user terminal 4, and cloud print server 5 via the Internet NT.

The memory 12B includes an identification information storing area 40B. As shown in FIG. 4, the identification information storing area 40B stores a printer ID obtained from the printer 2A. The printer ID from the printer 2A is temporarily stored until the end of the validity period and is deleted after the lapse of the validity period. The identification information storing area 40B may store a printer ID for the printer 2B. In this embodiment, the printer 2B has not been registered with the cloud print server 5, and no printer ID for the printer 2B has been stored in the identification information storing area 40B.

The memory 12B further includes a validity period information storing area 42B. As shown in FIG. 5, the validity period information storing area 42B stores validity period information obtained from the printer 2A.

The controller 10B includes a print controller 20B, a print job reception controller 22B, an identification information registration controller 24B, an identification information deletion controller 26B, an identification information obtaining controller 34, a validity period monitoring unit 30B, and a connection controller 32B.

The identification information obtaining controller 34 obtains the printer ID for identifying the printer 2A. The identification information obtaining controller 34 obtains the printer ID output by the identification information output controller 28. In this embodiment, the identification information obtaining controller 34 obtains the printer ID with the validity period information. Specifically, the identification information obtaining controller 34 obtains the printer ID for the printer 2A and the validity period information of the printer ID from the user terminal 4, and stores them in the identification information storing area 40B and validity period information storing area 42B. The obtained printer ID may be used for substitute printing by the printer 2B.

The print job reception controller 22B acquires a print job for the printer 2A from the cloud print server 5 by using the printer ID for the printer 2A stored in the identification information storing area 40B. Specifically, the print job reception controller 22B transmits a print job acquisition request including the printer ID obtained by the identification information obtaining controller 34 to the cloud print server 5, and receives a print job transmitted from the cloud print server 5 in response to the print job acquisition request. The print job reception controller 22B supplies the received print job to the print controller 20B, causing it to print the print job.

The validity period monitoring unit 30B restricts the reception of the print job by the print job reception controller 22B after the lapse of the validity period indicated by the validity period information. For example, the validity period monitoring unit 30B determines whether the validity period has elapsed; when it is determined that the validity period has elapsed, the validity period monitoring unit 30B puts the printer 2B into a state where the printer 2B cannot acquire a print job for the printer 2A from the cloud print server 5. Further, the validity period monitoring unit 30B deletes the printer ID obtained by the identification information obtaining controller 34 after the lapse of the validity period. Specifically, the validity period monitoring unit 30B monitors the validity period of the printer ID stored in the identification information storing area 40B based on the validity period information in the validity period information storing area 42B, and deletes the printer ID for the printer 2A from the identification information storing area 40B after the validity period has elapsed. The printer ID for the printer 2A is temporarily valid in the printer 2B during the validity period.

The connection controller 32B establishes or disconnects a persistent connection between the print job reception controller 22B of the printer 2B and the controller 50 of the cloud print server 5. In the persistent connection state, the print job reception controller 22B and the controller 50 are connected by using XMPP.

<1-5. Configuration of User Terminal>

Figure 7:
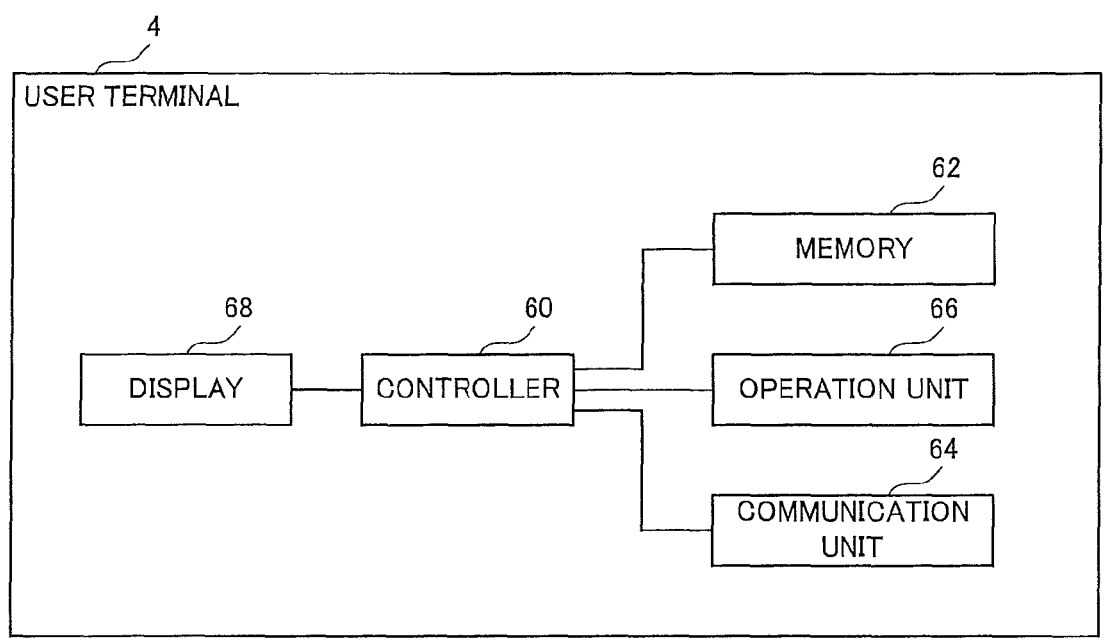
FIG. 7 is a schematic block diagram illustrating configuration of a user terminal.

As shown in FIG. 7, the user terminal 4 includes a controller 60, a memory 62, a communication unit 64, an operation unit 66, and a display 68. The controller 60 controls respective units, such as the memory 62, communication unit 64, operation unit 66, and display 68, in the user terminal 4. The controller 60 is based around a CPU (not shown). The controller 60 reads predetermined programs from the memory 62 and executes them, thereby controlling the respective units to perform various processes. The memory 62 may include a ROM, a RAM, a hard disc drive, a flash memory, or the like.

The communication unit 64 transmits and receives data to and from the printer 2A, printer 2B, and cloud print server 5 via the Internet NT.

The memory 62 stores various print jobs. The memory 62 further stores the printer ID for the printer 2A and validity period information obtained by the controller 60 from the printer 2A via the Internet NT.

The controller 60 reads a print job from the memory 62 and transmits it to the cloud print server 5 while designating a printer to which the print job is to be transmitted. The controller 60 may serve as a designation unit that designates the printer 2A registered with the cloud print server 5 and image data; the job obtaining unit 72 of the cloud print server 5 may receive the designation from the controller 60 and generate a print job for the designated printer 2A including the designated image data. For example, the controller 60 performs the designation in accordance with user's operation. For example, the controller 60 receives, via the operation unit 66, designation of a printer (e.g., printer 2A) registered with the cloud print server 5 and image data to be printed, and transmits the received designation to the cloud print server 5 via the communication unit 64.

The display 68 and operation unit 66 include, for example, an LCD and a touch panel formed integrally with each other; they display various screens and receive operation instructions from a user.

<1-6. Printing Process Procedure of Printer 2A>

Figure 8:
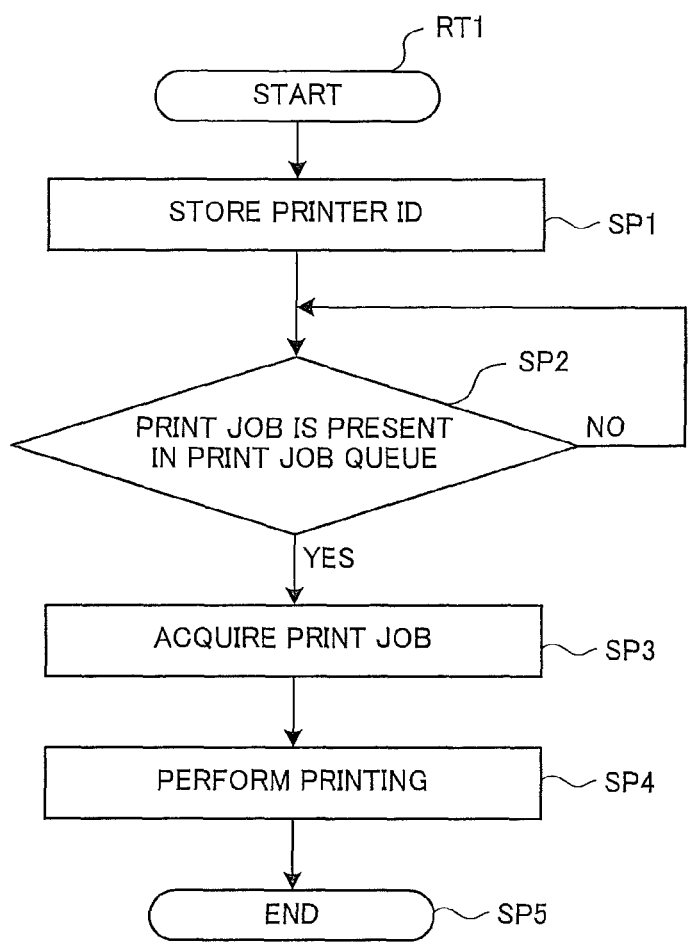
FIG. 8 is a flowchart illustrating a printing process procedure of the printer 2A in the first embodiment.

The specific procedure of the printing process by the printer 2A will be described with reference to FIG. 8. When the controller 10A receives an instruction to register the printer 2A with the cloud print server 5 through operation of the operation panel 17A by a user or the like, it reads a printing process program from the memory 12A and executes it, thereby starting the printing process procedure RT1 to move step SP1.

In step SP1, the controller 10A obtains a printer ID for the printer 2A from the cloud print server 5 by the identification information registration controller 24A and stores the printer ID in the identification information storing area 40A, proceeding to step SP2.

In step SP2, the controller 10A determines, by the print job reception controller 22A, whether a print job is present in the print job queue for the printer 2A in the cloud print server 5. If a negative determination is made (NO in step SP2), the controller 10A returns to step SP2 to determine again whether there is a print job in the print job queue for the printer 2A, waiting for a print job to be stored in the cloud print server 5.

When the printer ID has been output to the outside and the validity period has not elapsed, there is no persistent connection between the printer 2A and the cloud print server 5, and the controller 10A suspends the determination as to whether a print job is present in the print job queue for the printer 2A in the cloud print server 5.

On the other hand, if a positive determination is made (YES in step SP2), the controller 10A proceeds to step SP3 to acquire a print job from the print job queue for the printer 2A in the cloud print server 5.

In step SP4, the controller 10A prints the acquired print job by the print controller 20A, and then proceeds to step SP5 to end the printing process procedure RT1.

Figure 9:
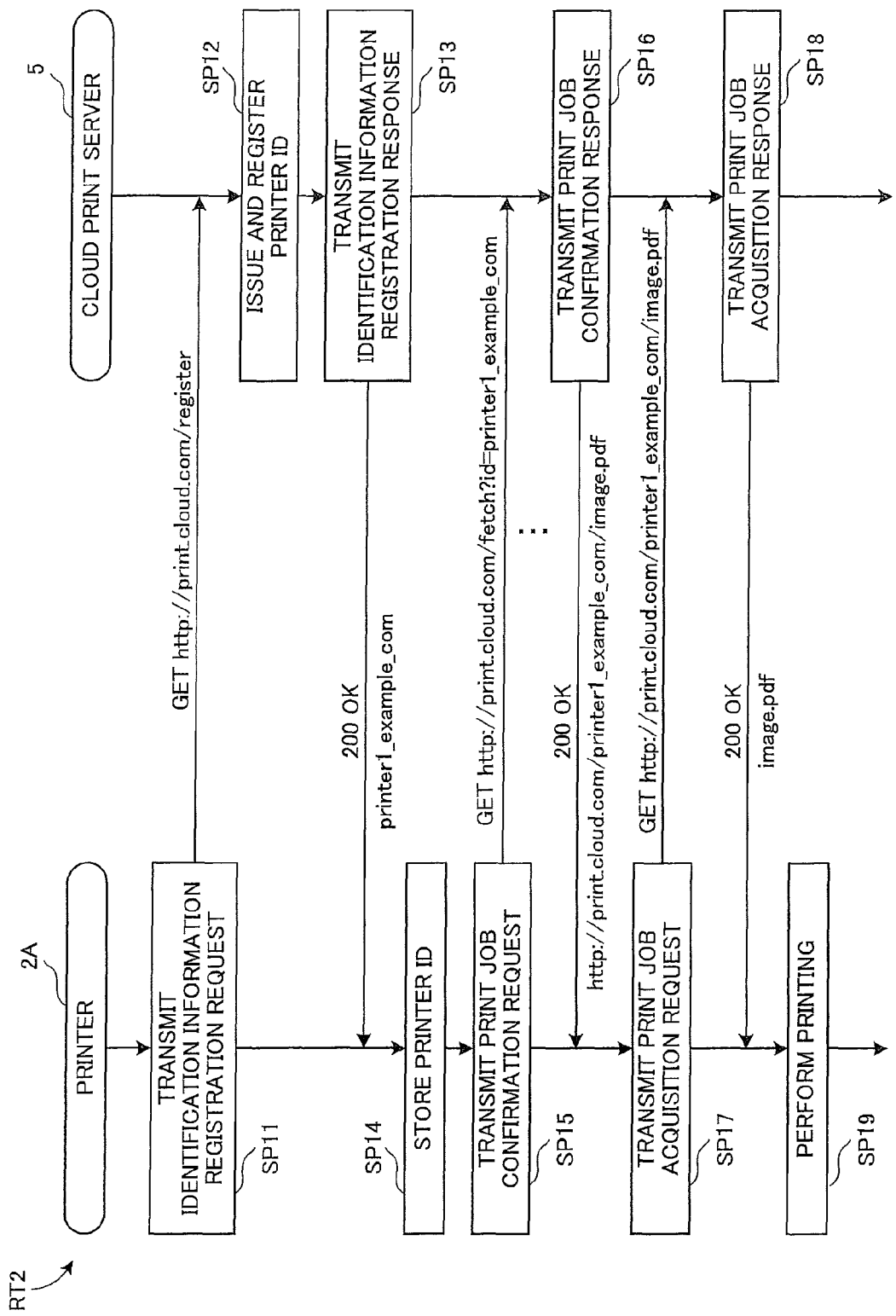
FIG. 9 is a sequence chart illustrating a printing process procedure of the printer 2A in the first embodiment.

Next, the printing process procedure RT2 of the printer 2A and cloud print server 5 in the cloud print system 1 will be described with reference to FIG. 9.

In step SP11, the controller 10A of the printer 2A transmits an identification information registration request to the cloud print server 5 by the identification information registration controller 24A. Specifically, the identification information registration controller 24A transmits a GET command to "http://print.cloud.com/register", which is a URL (Uniform Resource Locator) of the cloud print server 5 on the Internet NT.

Upon receiving the identification information registration request, the controller 50 of the cloud print server 5 issues a printer ID "printer1_example_com" for the printer 2A to register the printer ID in the cloud printer list in the memory 52 in step SP12, and transmits an identification information registration response to the printer 2A in step SP13. Specifically, the controller 50 transmits a normal response "200 OK" and the printer ID "printer1_example_com" to the printer 2A.

Upon receiving the identification information registration response by the identification information registration controller 24A, the controller 10A of the printer 2A stores the received printer ID in the identification information storing area 40A in step SP14. Then, the controller 10A transmits a print job confirmation request to the cloud print server 5 by the print job reception controller 22A in step SP15. Specifically, the print job reception controller 22A transmits a GET command to "http://print.cloud.com/fetch?id=printer1_example_com", which is a URL of the print job queue for the printer 2A in the cloud print server 5 on the Internet NT. In this example, the printer ID "printer1_example_com" is transmitted to the cloud print server 5 in the form of a URL query string.

Until receiving a print job from the cloud print server 5, the controller 10A regularly transmits a print job confirmation request to the cloud print server 5 by the print job reception controller 22A, thereby regularly inquiring of the cloud print server 5 whether a print job is present in the print job queue for the printer 2A in the cloud print server 5.

When the controller 50 of the cloud print server 5 receives the print job confirmation request, if a print job is present in the print job queue for the printer 2A in the memory 52, the controller 50 transmits a print job confirmation response to the printer 2A in step SP16. Specifically, the controller 50 transmits, to the printer 2A, a normal response "200 OK" and "http://print.cloud.com/printer1_example_com/image.pdf", which is a URL at which a print job is stored. If no print job is present in the print job queue for the printer 2A in the memory 52, the controller 50 transmits a normal response "200 OK" and "null", which indicates the absence of a print job, to the printer 2A.

Upon receiving the print job confirmation response, the print job reception controller 22A of the controller 10A of the printer 2A transmits a print job acquisition request to the cloud print server 5 in step SP17. Specifically, the print job reception controller 22A transmits a GET command to "http://print.cloud.com/printer1_example_com/image.pdf", which is a URL at which a print job is stored.

Upon receiving the print job acquisition request, the controller 50 of the cloud print server 5 transmits a print job acquisition response to the printer 2A in step SP18. Specifically, the controller 50 transmits a normal response "200 OK" and print job data "image.pdf" to the printer 2A.

Upon receiving the print job acquisition response by the print job reception controller 22A, the controller 10A of the printer 2A prints print data based on the print job by the print controller 20A in step SP19.

<1-7. Identification Information Acquisition Process Procedure>

Next, the identification information acquisition process procedure RT3 in which the user terminal 4 acquires the printer ID from the printer 2A in the cloud print system 1 will be described with reference to FIG. 10.

It will be assumed that the printer ID for the printer 2A has been registered with the cloud print server 5 and there is a persistent connection between the print job reception controller 22A of the printer 2A and the controller 50 of the cloud print server 5. In the persistent connection state, the printer 2A and the cloud print server 5 are connected by XMPP.

When the controller 60 of the user terminal 4 receives, through operation of the user terminal 4 by a user, an instruction to acquire the printer ID, it transmits a printer ID acquisition request to the printer 2A in step SP21. Specifically, the controller 60 transmits a GET command to "http://printer1.example.com/register", which is a URL of the printer 2A on the Internet NT.

Upon receiving the printer ID acquisition request by the identification information output controller 28, the controller 10A of the printer 2A sets a validity period and stores, in the validity period information storing area 42A, validity period information indicating the set validity period in association with the printer ID in step SP22.

In step SP23, the controller 10A performs a disconnection process by the connection controller 32A, thereby disconnecting the persistent connection between the print job reception controller 22A and the controller 50 of the cloud print server 5. This puts the cloud print server 5 into a state where, even when it receives a print job for the printer 2A (i.e., printer to which the printer ID "printer1_example_com" of the printer 2A is assigned, it cannot transmit the print job to the printer 2A.

In step SP24, the controller 10A transmits the printer ID for the printer 2A and the validity period information to the user terminal 4 by the identification information output controller 28. Specifically, the controller 10A transmits a normal response "200 OK", the printer ID "printer1_example_com" for the printer 2A, and the validity period information "20130909" to the user terminal 4.

Upon receiving the printer ID and validity period information, the controller 60 of the user terminal 4 stores the printer ID and validity period information in the memory 62 in step SP25.

After that, when the validity period has elapsed (i.e., on Sep. 10, 2013), the controller 10A of the printer 2A performs a connection process by the connection controller 32A in step SP26, thereby establishing a persistent connection between the print job reception controller 22A and the controller 50 of the cloud print server 5. This puts the cloud print server 5 into a state where, when it receives a print job for the printer 2A (i.e., printer to which the printer ID "printer1_example_com" of the printer 2A is assigned, it can transmit the print job to the printer 2A.

As such, when the printer ID for the printer 2A has already been registered in the cloud print server 5, the user terminal 4 copies and acquires the printer ID from the printer 2A. The user terminal 4 may provide the printer ID to the printer 2B, whose printer ID has not yet been registered in the cloud print server 5.

The printer 2A is configured to, when receiving a printer ID acquisition request from the user terminal 4, before transmitting the printer ID for the printer 2A and the validity period information to the user terminal 4, by disconnecting the persistent connection with the cloud print server 5, enter a state where it receives no print job from the cloud print server 5.

<1-8. Identification Information Providing Process Procedure>

Figure 11:
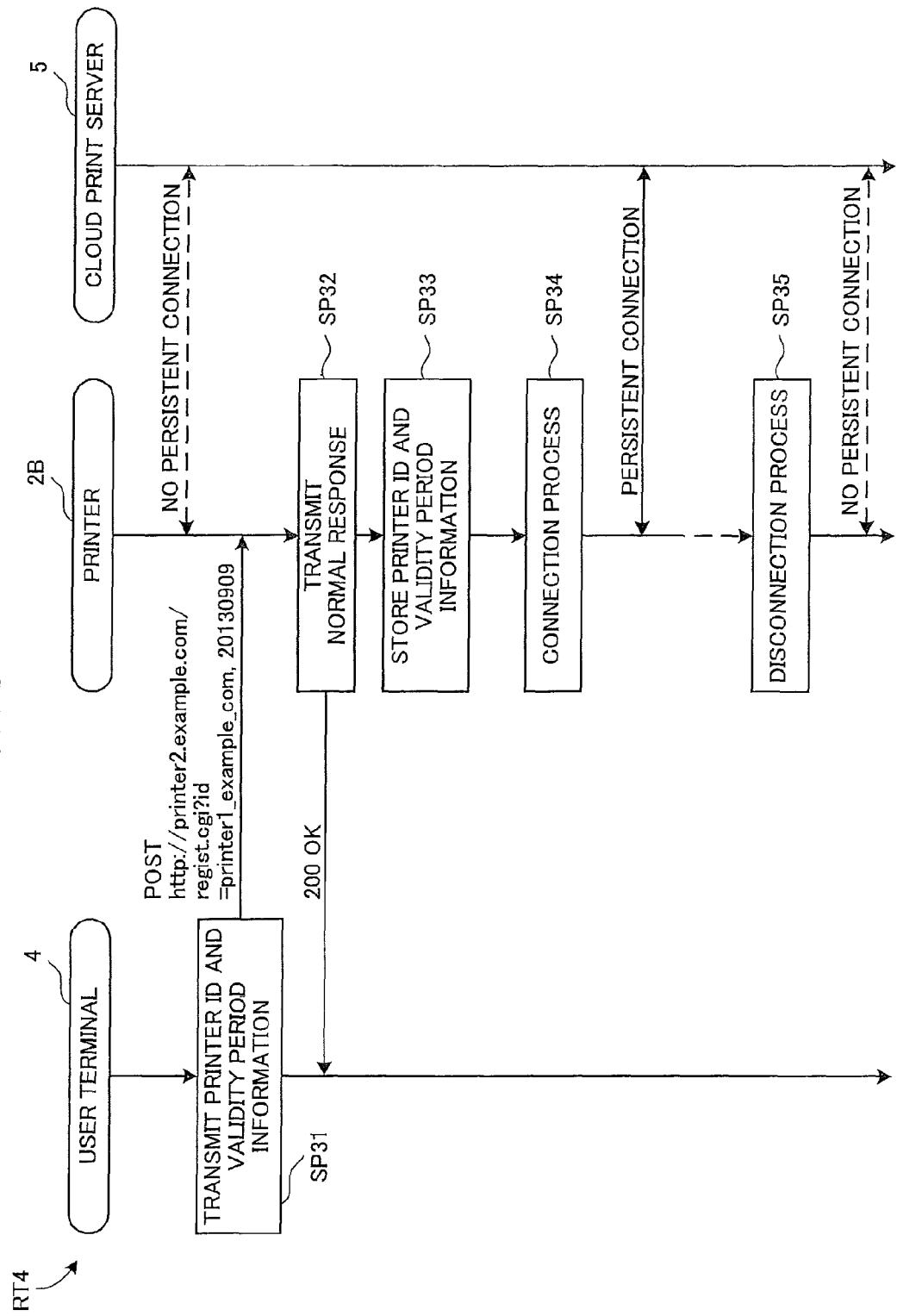
FIG. 11 is a sequence chart illustrating an identification information providing process procedure.

Next, the identification information providing process procedure RT4 in which the user terminal 4 provides the printer ID for the printer 2A to the printer 2B in the cloud print system 1 will be described with reference to FIG. 11.

It will be assumed that no printer ID for the printer 2B has been registered in the cloud print server 5; there is no persistent connection between the print job reception controller 22B of the printer 2B and the controller 50 of the cloud print server 5; thus, the printer 2B is in a state where it cannot acquire a print job from the cloud print server 5.

Figure 10:
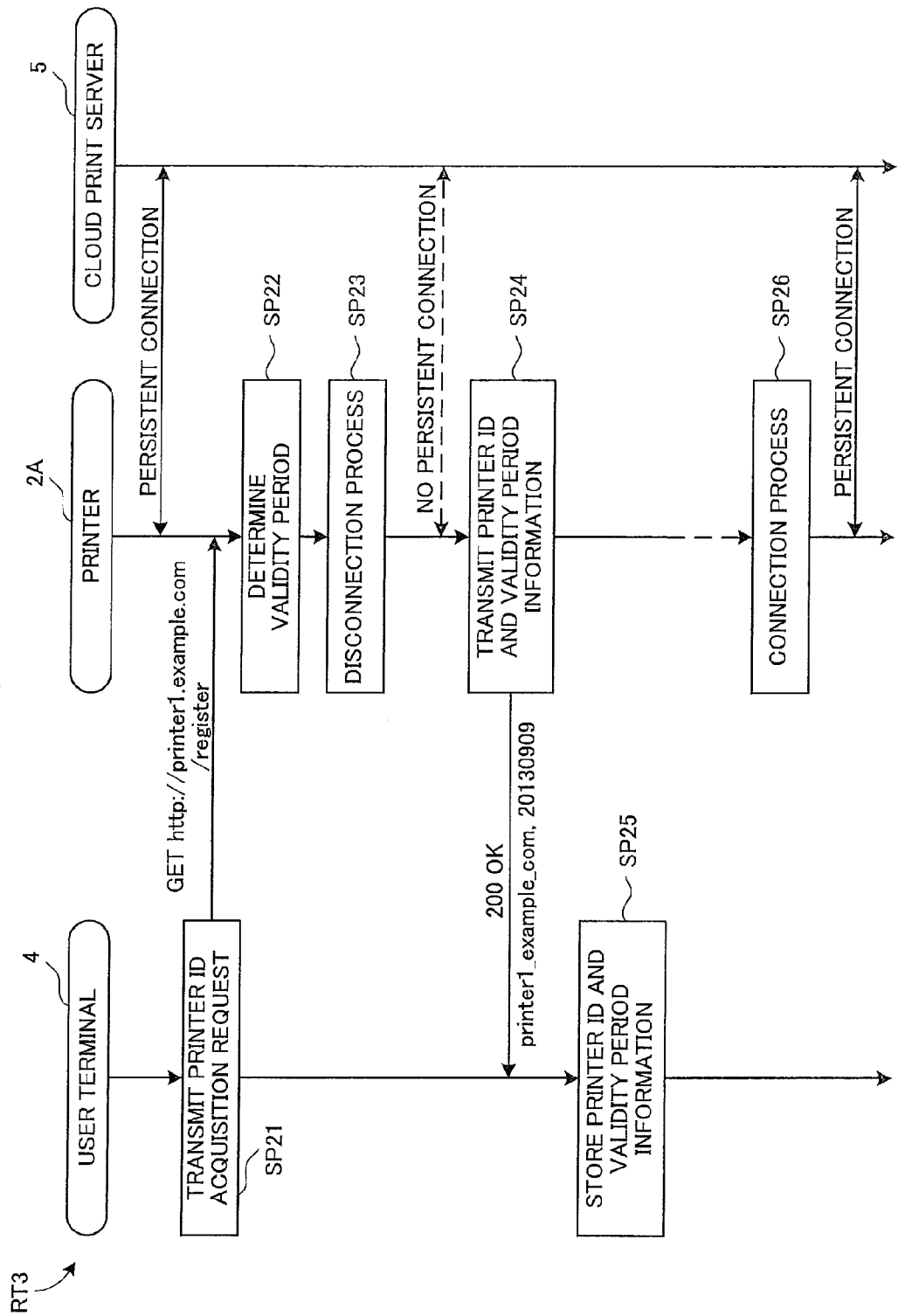
FIG. 10 is a sequence chart illustrating an identification information acquisition process procedure.

After step SP25 in the identification information acquisition process procedure RT3 shown in FIG. 10, when the controller 60 of the user terminal 4 receives, through operation of the user terminal 4 by a user, an instruction to provide the printer 2B with the printer ID, it reads the printer ID and validity period information from the memory 62 and transmits them to the printer 2B in step SP31. Specifically, the controller 60 transmits a POST command with the validity period information "20130909" to "http://printer2.example.com/regist.cgi?id=printer1_example_com", which is a URL of the printer 2B on the Internet NT.

Upon receiving the printer ID and validity period information by the identification information obtaining controller 34, the controller 10B of the printer 2B transmits a normal response "200 OK" to the user terminal 4 in step SP32.

In step SP33, the controller 10B stores the printer ID "printer1_example_com" in the identification information storing area 40B and stores the validity period information "20130909" in the validity period information storing area 42B.

In step SP34, the controller 10B establishes, by the connection controller 32B, a persistent connection between the print job reception controller 22B and the controller 50 of the cloud print server 5. In the persistent connection state, the printer 2B and cloud print server 5 are connected by XMPP. Thereby, the printer 2B enters a state where it can acquire a print job from the cloud print server 5.

After that, when the validity period has elapsed, the controller 10B of the printer 2B performs a disconnection process by the connection controller 32B in step SP35, thereby disconnecting the persistent connection between the print job reception controller 22B and the controller 50 of the cloud print server 5. This puts the printer 2B into a state where it cannot acquire a print job from the cloud print server 5.

<1-9. Printing Process Procedure of Printer 2B>

Figure 12:
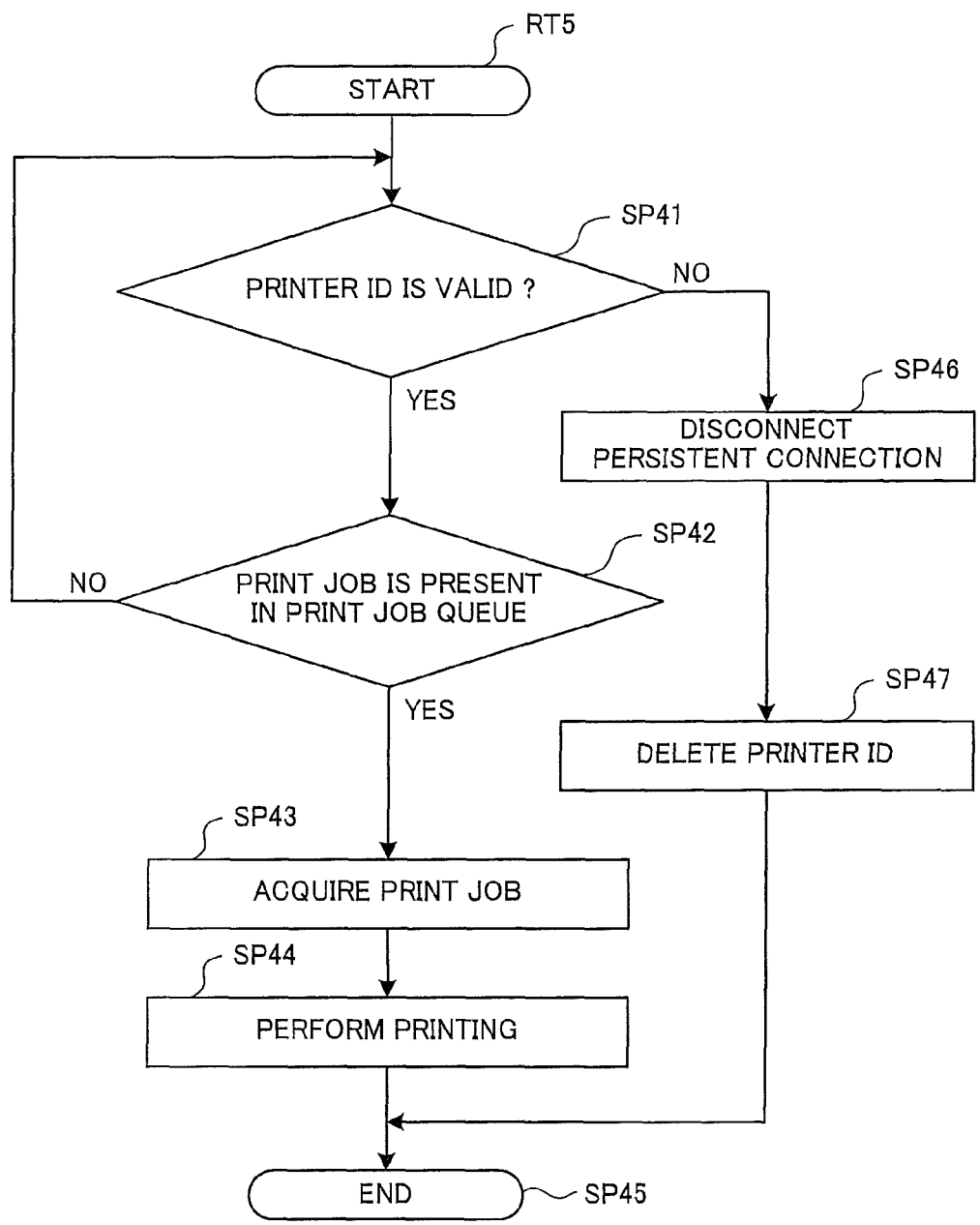
FIG. 12 is a flowchart illustrating a printing process procedure of the printer 2B in the first embodiment.

The specific procedure of the printing process by the printer 2B will be described with reference to FIG. 12. The controller 10B reads a printing process program from the memory 12B and executes it, thereby starting the printing process procedure RT5 to move step SP41.

In step SP41, the controller 10B determines, by the validity period monitoring unit 30B, whether the printer ID obtained from the printer 2A is valid. Specifically, the validity period monitoring unit 30B determines whether the current date and time is within the validity period indicated by the validity period information. If a positive determination is made (YES in step SP41), the controller 10B proceeds to step SP42.

In step SP42, the controller 10B determines, by the print job reception controller 22B, whether a print job is present in the print job queue for the printer 2A in the cloud print server 5. If a negative determination is made (NO in step SP42), the controller 10B returns to step SP41.

On the other hand, if a positive determination is made (YES in step SP42), the controller 10B proceeds to step SP43 to acquire a print job from the print job queue for the printer 2A in the cloud print server 5.

In step SP44, the controller 10B prints the acquired print job by the print controller 20B, and then proceeds to step SP45 to end the printing process procedure RT5.

On the other hand, if a positive determination is made (YES in step SP41), the controller 10B moves to step SP46.

In step SP46, the controller 10B disconnects, by the connection controller 32B, the persistent connection between the print job reception controller 22B and the controller 50 of the cloud print server 5, moving to step SP47.

In step SP47, the controller 10B deletes the printer ID for the printer 2A from the identification information storing area 40B, moving to step SP45 to end the printing process procedure RT5.

Figure 13:
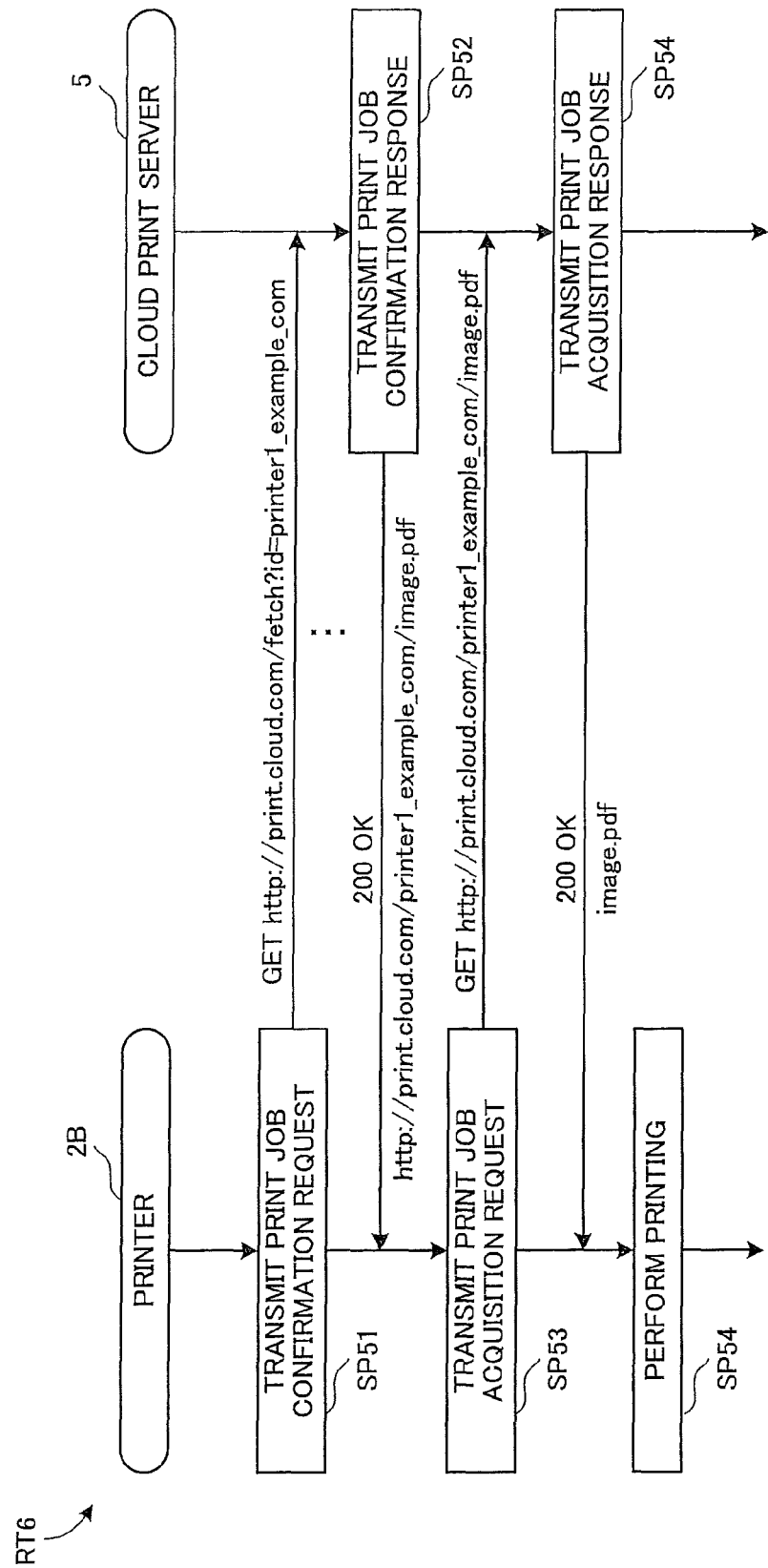
FIG. 13 is a sequence chart illustrating a printing process procedure of the printer 2B in the first embodiment.

Next, the printing process procedure RT6 of the printer 2B and cloud print server 5 in the cloud print system 1 will be described with reference to FIG. 13.

In step SP51, the controller 10B of the printer 2B transmits a print job confirmation request to the cloud print server 5 by the print job reception controller 22B. Specifically, the print job reception controller 22B reads the printer ID "printer1_example_com" for the printer 2A stored in the identification information storing area 40B, and transmits a GET command to "http://print.cloud.com/fetch?id=printer1_example_com", which is a URL of the print job queue for the printer 2A in the cloud print server 5 on the Internet NT.

Until receiving a print job from the cloud print server 5, the controller 10B regularly transmits a print job confirmation request to the cloud print server 5 by the print job reception controller 22B, thereby regularly inquiring of the cloud print server 5 whether a print job is present in the print job queue for the printer 2A in the cloud print server 5.

When the controller 50 of the cloud print server 5 receives the print job confirmation request, if a print job is present in the print job queue for the printer 2A in the memory 52, the controller 50 transmits a print job confirmation response to the printer 2B in step SP52. Specifically, the controller 50 transmits, to the printer 2B, a normal response "200 OK" and "http://print.cloud.com/printer1_example_com/image.pdf", which is a URL at which a print job is stored. If no print job is present in the print job queue for the printer 2A in the memory 52, the controller 50 transmits a normal response "200 OK" and "null", which indicates the absence of a print job, to the printer 2B.

Upon receiving the print job confirmation response, the print job reception controller 22B of the controller 10B of the printer 2B transmits a print job acquisition request to the cloud print server 5 in step SP53. Specifically, the print job reception controller 22B transmits a GET command to "http://print.cloud.com/printer1_example_com/image.pdf", which is a URL at which a print job is stored.

Upon receiving the print job acquisition request, the controller 50 of the cloud print server 5 transmits a print job acquisition response to the printer 2B in step SP54. Specifically, the controller 50 transmits a normal response "200 OK" and print job data "image.pdf" to the printer 2B.

Upon receiving the print job acquisition response by the print job reception controller 22B, the controller 10B of the printer 2B prints print data based on the print job by the print controller 20B in step SP54.

As such, the user terminal 4 provides the printer ID for the printer 2A and the validity period information to the printer 2B, thereby allowing, during the validity period, the printer 2B to print a print job for the printer to which the printer ID for the printer 2A is assigned.

<1-10. Advantages>

As described above, the printer 2B includes the identification information obtaining controller 34 that obtains the printer ID for identifying the printer 2A, and a print job reception controller 22B that transmits a print job acquisition request including the printer ID obtained by the identification information obtaining controller 34 to the cloud print server 5 and receives a print job transmitted from the cloud print server 5 in response to the print job acquisition request. This makes it possible to improve the convenience of the cloud print system 1. For example, according to this embodiment, even if the printer 2B has not been registered with the cloud print server 5, the printer 2B can acquire a print job from the cloud print server 5 by using the printer ID for the printer 2A, which has been registered with the cloud print server 5. More specifically, this embodiment allows the printer 2B, which has not been registered with the cloud print server 5, to print a print job for the printer 2A, which has been registered with the cloud print server 5, by using the printer ID for the printer 2A, without registration of a printer ID for the printer 2B with the cloud print server 5. Thus, a user can cause the printer 2B, whose printer ID has not been registered with the cloud print server 5, to print a print job for the printer 2A without troublesome operation for registering a printer ID for the printer 2B with the cloud print server 5.

In this embodiment, an unregistered printer obtains, from a registered printer, identification information required for acquiring a print job from the cloud print server 5, and then acquires a print job for the registered printer from the cloud print server 5 by using the obtained identification information (specifically, by transmitting the obtained identification information to the cloud print server 5). With this configuration, an unregistered printer can be used in the cloud print service.

In the above cloud print system 1, the printer ID for the printer 2A is provided to the printer 2B via the user terminal 4 as an identification information delivery device.

The printer 2A provides, in addition to the printer ID, the validity period information to the printer 2B, thereby allowing the printer 2B to receive a print job for the printer to which the printer ID for the printer 2A is assigned only during the validity period. This can prevent the use of the printer 2B unexpected by an administrator of the printer 2B.

When the validity period has elapsed, the printer 2A validates the printer ID in the printer 2A and establishes a persistent connection automatically without user's operation. Thus, after the printer 2A has been disabled from receiving a print job from the cloud print server 5, the printer 2A can re-enable itself to receive a print job from the cloud print server 5 without requiring a user to perform troublesome operation for re-enabling the disabled reception.

For substitute printing, what the cloud print server 5 does is, for example, to perceive: when the persistent connection between the printer 2A and the cloud print server 5 is disconnected, that the printer to which the printer ID "printer1_example_com" is assigned is powered off; when a persistent connection between the printer 2B and the cloud print server 5 is established, that the printer to which the printer ID "printer1_example_com" is assigned is powered on; after that, when the persistent connection between the printer 2B and the cloud print server 5 is disconnected, that the printer to which the printer ID "printer1_example_com" is assigned is powered off; and when a persistent connection between the printer 2A and the cloud print server 5 is established, that the printer to which the printer ID "printer1_example_com" is assigned is powered on. Thus, substitute printing can be temporarily performed by the printer 2B without special operation or processing in the cloud print server 5.

When the printer 2A receives a printer ID acquisition request from the user terminal 4, before transmitting the printer ID for the printer 2A and the validity period information to the user terminal 4, it disconnects the persistent connection with the cloud print server 5, thereby entering a state where it receives no print job from the cloud print server 5. This can prevent a situation where the cloud print server 5 perceives two printers including the printers 2A and 2B as the printer to which the printer ID "printer1_example_com" is assigned, which may make it unclear which printer performs printing.

In the above configuration, the cloud print system 1 has a plurality of printers 2 connected to the cloud print server 5; at least one of the printers 2 transmits a printer ID as identification information identifying the printer 2 to the cloud print server 5 to receive a print job from the cloud print server 5. The plurality of printers 2 includes the printer 2A and printer 2B. The printer 2A includes the identification information output controller 28 that provides the printer ID identifying the printer 2A to the printer 2B via the user terminal 4. The printer 2B includes: the identification information obtaining controller 34 that obtains the printer ID for the printer 2A from the printer 2A via the user terminal 4; the print job reception controller 22B that acquires a print job for the printer to which the printer ID for the printer 2A is assigned from the cloud print server 5; and the print controller 20B that performs printing based on the print job acquired from the cloud print server 5. With this configuration, even if no printer ID for the printer 2B has been registered with the cloud print server 5, the printer 2B can print a print job for the printer 2A by using the printer ID for the printer 2A.

<2. Second Embodiment>

<2-1. Configuration of Cloud Print System>

Figure 14:
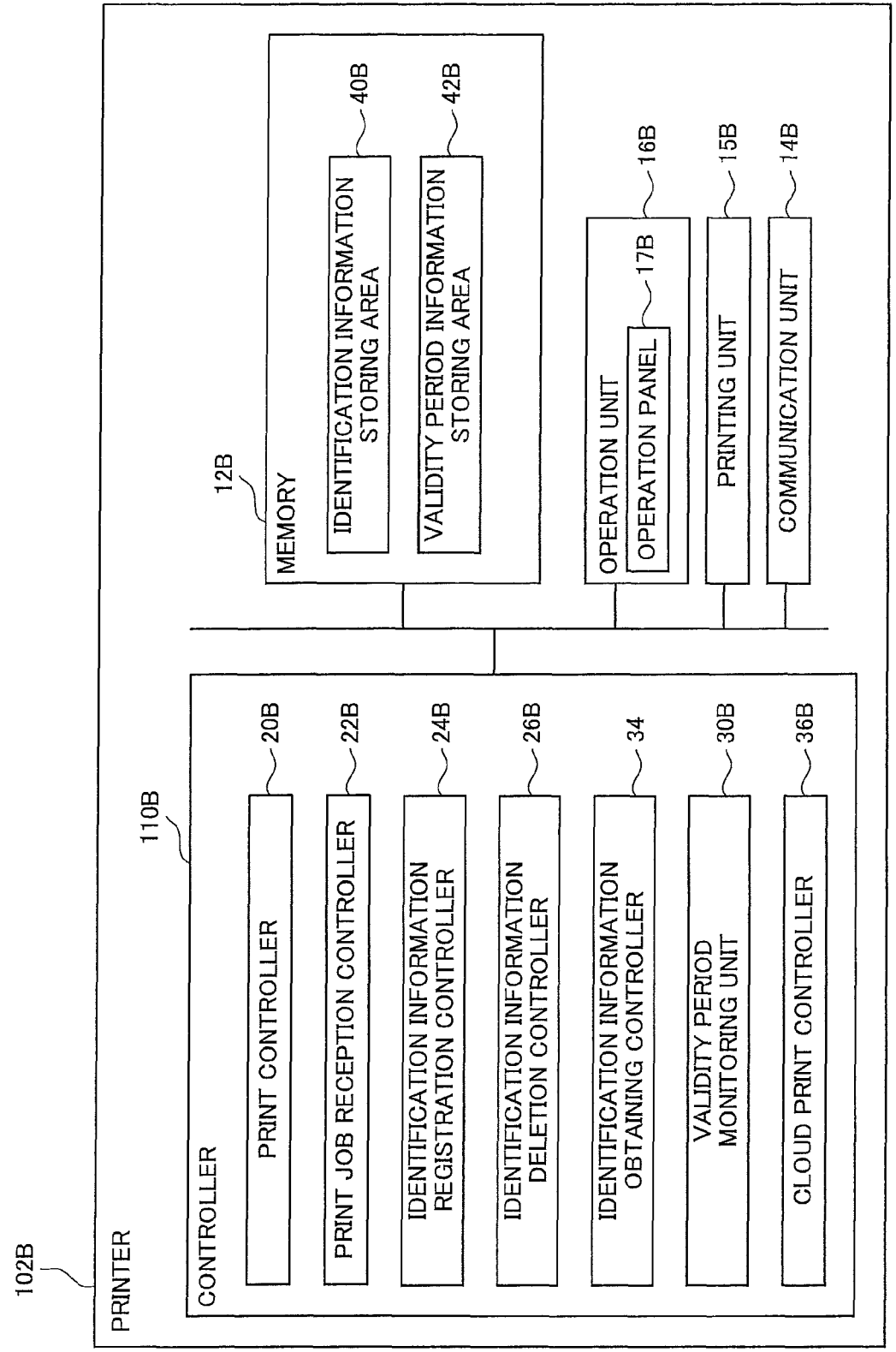
FIG. 14 is a schematic block diagram illustrating a configuration of a printer 102B in a second embodiment.
Figure 15:
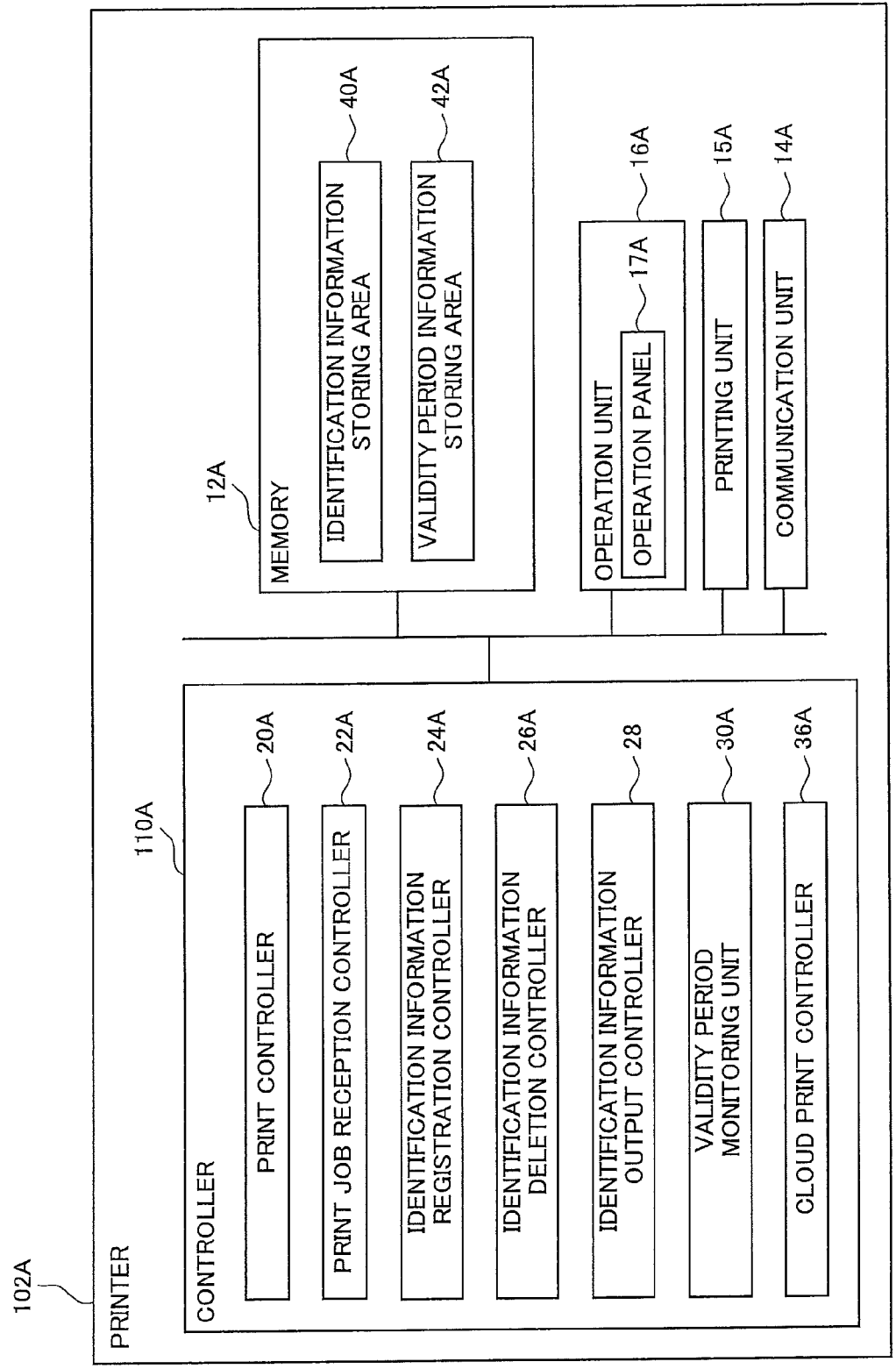
FIG. 15 is a schematic block diagram illustrating a configuration of a printer 102A in the second embodiment.

FIG. 1 also illustrates a cloud print system 101 in the second embodiment. As shown in FIG. 1, the cloud print system 101 includes printers 102A and 102B. The printers 102A and 102B are illustrated in FIGS. 14 and 15, and include controllers 110A and 110B, respectively. The cloud print system 101 differs from the cloud print system 1 in the first embodiment in that the controllers 110A and 110B differ from the controllers 10A and 10B of the printers 2A and 2B in the first embodiment, but otherwise is the same. Descriptions of parts that are the same as in the first embodiment will be omitted or simplified in the description below, and the same reference characters will be used for elements that are the same as or correspond to those in the first embodiment.

Instead of the connection controllers 32A and 32B in the controllers 10A and 10B, the controllers 110A and 110B include cloud print controllers 36A and 36B, respectively.

<2-2. Configuration of Printer 102B>

As shown in FIG. 14, the configuration of the printer 102B is substantially the same as that of the printer 2B shown in FIG. 6, so the following description will mainly focus on differences from the printer 2B.

The controller 110B includes a print controller 20B, a print job reception controller 22B, an identification information registration controller 24B, an identification information deletion controller 26B, an identification information obtaining controller 34, a validity period monitoring unit 30B, and a cloud print controller 36B.

The cloud print controller 36B transmits a disable command to the printer 102A when the identification information obtaining controller 34 obtains the printer ID for the printer 102A. The cloud print controller 36B transmits an enable command to the printer 102A after the lapse of the validity period indicated by the validity period information obtained by the identification information obtaining controller 34. Specifically, the cloud print controller 36B transmits a disable command or an enable command to the printer 102A via the Internet NT, thereby controlling disabling or enabling of the cloud print of the printer 102A. The disable command and enable command are transmitted as if they were print jobs. The cloud print means a function or process of acquiring a print job from the cloud print server 5 and printing it.

<2-3. Configuration of Printer 102A>

As shown in FIG. 15, the configuration of the printer 102A is substantially the same as that of the printer 2A shown in FIG. 3, so the following description will mainly focus on differences from the printer 2A.

The controller 110A includes a print controller 20A, a print job reception controller 22A, an identification information registration controller 24A, an identification information deletion controller 26A, an identification information output controller 28, a validity period monitoring unit 30A, and a cloud print controller 36A.

The cloud print controller 36A, upon receiving a disable command from the cloud print controller 36B, restricts the reception of the print job by the print job reception controller 22A. For example, in response to the disable command, the cloud print controller 36A puts the printer 2A into a state where the printer 2A cannot acquire a print job for the printer 2A from the cloud print server 5. Further, the cloud print controller 36A, upon receiving an enable command from the cloud print controller 36B when the reception of the print job by the print job reception controller 22A is restricted, removes the restriction of the reception of the print job by the print job reception controller 22A. For example, in response to the enable command, the cloud print controller 36A puts the printer 2A into a state where the printer 2A can acquire a print job for the printer 2A from the cloud print server 5. The cloud print controller 36A receives a disable command or an enable command from the printer 102B via the Internet NT, thereby controlling disabling or enabling of the cloud print of the printer 102A. The disable command and enable command are received as if they were print jobs.

When disabling the cloud print, the cloud print controller 36A puts the cloud print system 1 into a state where an enable command and a disable command can be transmitted but no print job can be transmitted from the cloud print server 5 to the printer 102A, or puts the printer 102A into a state where the printer 102A can receive, from the cloud print server 5, an enable command and a disable command but no print job. When enabling the cloud print, the cloud print controller 36A puts the cloud print system 1 into a state where a print job, an enable command, and a disable command can be transmitted from the cloud print server 5 to the printer 102A, or puts the printer 102A into a state where the printer 102A can receive, from the cloud print server 5, a print job, an enable command, and a disable command.

<2-4. Printing Process Procedure of Printer 102A>

Figure 16:
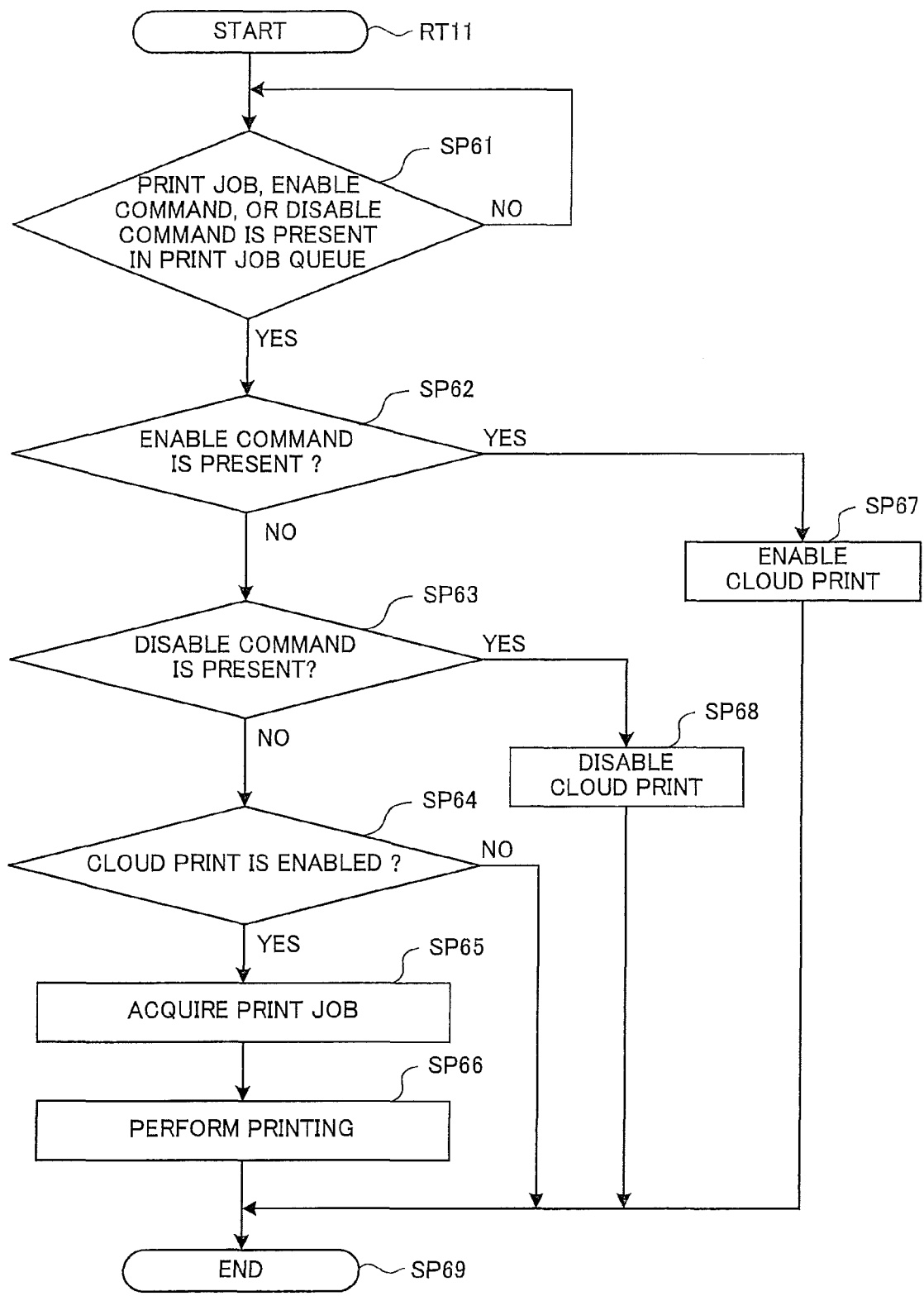
FIG. 16 is a flowchart illustrating a printing process procedure of the printer 102A in the second embodiment.

The specific procedure of the printing process by the printer 102A will be described with reference to FIG. 16. It will be assumed that the printer ID for the printer 102A has been registered with the cloud print server 5. The controller 110A reads a printing process program from the memory 12A and executes it, thereby starting the printing process procedure RT11 to move step SP61.

In step SP61, the controller 110A determines, by the print job reception controller 22A, whether a print job, an enable command, or a disable command is present in the print job queue for the printer 102A in the cloud print server 5. Specifically, the controller 110A transmits a print job confirmation request to the cloud print server 5, receives a response from the cloud print server 5, and makes the determination based on the response. If a negative determination is made (NO in step SP61), the controller 110A returns to step SP61 to determine again whether a print job, an enable command, or a disable command is present in the print job queue for the printer 102A, waiting for a print job, an enable command, or a disable command to be stored in the cloud print server 5.

On the other hand, if a positive determination is made (YES in step SP61), the controller 110A proceeds to step SP62.

In step SP62, the controller 110A determines, by the cloud print controller 36A, whether an enable command is present in the print job queue. Specifically, if the response from the cloud print server 5 indicates that an enable command is present, the controller 110A makes a positive determination. If a positive determination is made (YES in step SP62), the controller 110A moves to step SP67 to acquire the enable command from the print job queue and enable the cloud print of the printer 102A by the cloud print controller 36A, moving to step SP69 to end the printing process procedure RT11. Thereby, the printer 102A enters a state where it can acquire a print job from the cloud print server 5.

On the other hand, if a negative determination is made (NO in step SP62), the controller 110A moves to step SP63 to determine, by the cloud print controller 36A, whether a disable command is present in the print job queue. Specifically, if the response from the cloud print server 5 indicates that a disable command is present, the controller 110A makes a positive determination. If a positive determination is made (YES in step SP63), the controller 110A moves to step SP68 to acquire the disable command from the print job queue and disable the cloud print of the printer 102A by the cloud print controller 36A, moving to step SP69 to end the printing process procedure RT11. Thereby, the printer 102A enters a state where it cannot acquire a print job from the cloud print server 5.

On the other hand, if a negative determination is made (NO in step SP63), the controller 110A moves to step SP64 to determine whether the cloud print of the printer 102A is enabled.

If a positive determination is made (YES in step SP64), the controller 110A moves to step SP65 to acquire the print job from the print job queue for the printer 102A in the cloud print server 5. Then, the controller 110A moves to step SP66 to print the acquired print job by the print controller 20A, moving to step SP69 to end the printing process procedure RT11. On the other hand, if a negative determination is made (NO in step SP64), the controller 110A moves to step SP69 to end the printing process procedure RT11 without acquiring the print job.

<2-5. Cloud Print Disabling Process Procedure>

Figure 17:
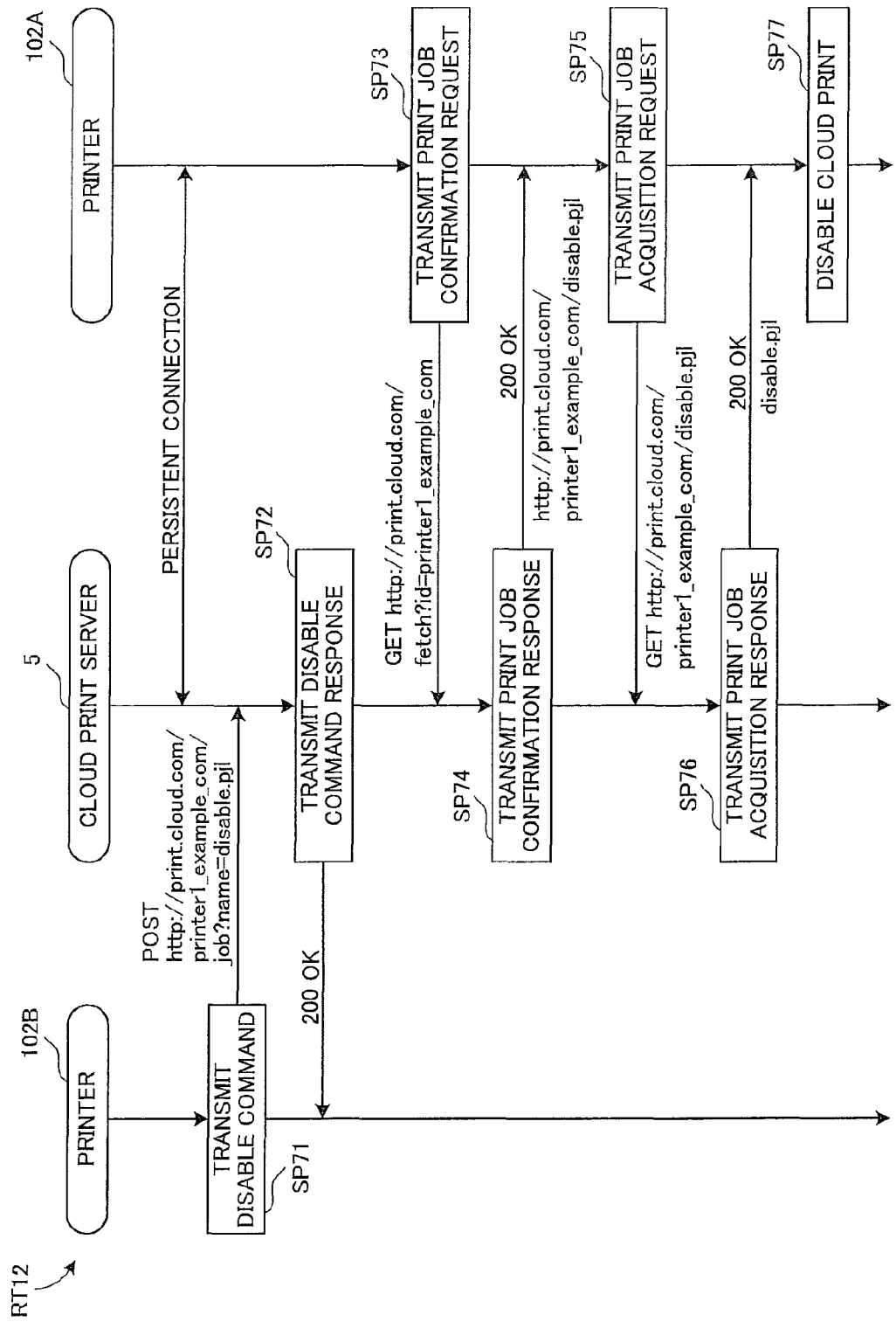
FIG. 17 is a sequence chart illustrating a print disabling process procedure.

Next, the cloud print disabling process procedure RT12 for the printer 102A by the cloud print system 101 will be described with reference to FIG. 17. It will be assumed that the printer ID for the printer 102A has been registered with the cloud print server 5 but no printer ID for the printer 102B has been registered with the cloud print server 5. It will also be assumed that there is a persistent connection between the print job reception controller 22A of the printer 102A and the controller 50 of the cloud print server 5.

When the controller 110B of the printer 102B receives the printer ID and validity period information from the user terminal 4 and stores them in the identification information storing area 40B and validity period information storing area 42B by the identification information obtaining controller 34, the controller 110B transmits a disable command to the cloud print server 5 by the cloud print controller 36B in step SP71.

Figure 19:
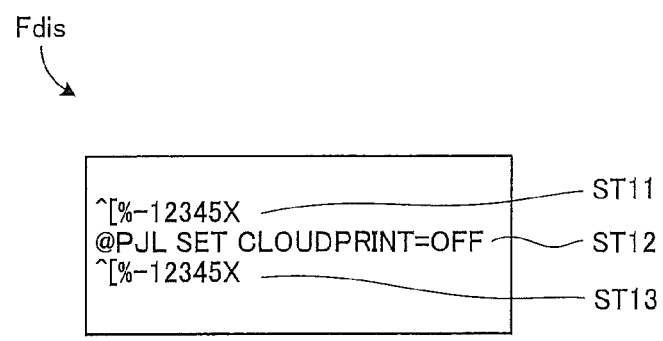
FIG. 19 illustrates a disable command file.

Specifically, the cloud print controller 36B transmits a POST command to "http://print.cloud.com/printer1_example_com/job?name=disable.pjl", which is a URL for transmission of print jobs for the printer 102A in the cloud print server 5 on the Internet NT. At this time, the cloud print controller 36B transmits a disable command file Fdis having a file name "disable.pjl" shown in FIG. 19.

The disable command file Fdis is in PJL (Printer Job Language) format, and consists of a string ST12 and two strings ST11 and ST13 placed before and after the string ST12. The string ST12 is "@PJL SET CLOUDPRINT=OFF", which indicates a command to disable the cloud print. Each of the strings ST11 and ST13 is "^[%-12345X", which is a UEL (Universal Exit Language) string indicating a delimiter of the command.

When the controller 50 of the cloud print server 5 receives the disable command file Fdis, it stores the disable command file Fdis in the print job queue for the printer 102A in the memory 52 and transmits a disable command response to the printer 102B in step SP72. Specifically, the controller 50 transmits a normal response "200 OK" to the printer 102B.

In step SP73, the controller 110A of the printer 102A transmits a print job confirmation request to the cloud print server 5 by the print job reception controller 22A. Specifically, the print job reception controller 22A transmits a GET command to "http://print.cloud.com/fetch?id=printer1_example_com", which is a URL of the print job queue for the printer 102A in the cloud print server 5 on the Internet NT.

When the controller 50 of the cloud print server 5 receives the print job confirmation request, it transmits a print job confirmation response to the printer 102A in step SP74. Specifically, the controller 50 transmits a normal response "200 OK" and "http://print.cloud.com/printer1_example_com/disable.pjl", which is a URL at which the disable command file Fdis is stored, to the printer 102A.

Upon receiving the print job confirmation response, the print job reception controller 22A of the controller 110A of the printer 102A transmits a print job acquisition request to the cloud print server 5 in step SP75. Specifically, the print job reception controller 22A transmits a GET command to "http://print.cloud.com/printer1_example_com/disable.pjl".

Upon receiving the print job acquisition request, the controller 50 of the cloud print server 5 transmits a print job acquisition response to the printer 102A in step SP76. Specifically, the controller 50 transmits a normal response "200 OK" and the disable command file Fdis with the file name "disable.pjl" to the printer 102A.

Upon receiving the print job acquisition response by the print job reception controller 22A, the controller 110A of the printer 102A disables the cloud print of the printer 102A by the cloud print controller 36A in step SP77.

As such, when the printer 102B obtains the printer ID for the printer 102A, it transmits a disable command to the printer 102A via the cloud print server 5, thereby disabling the cloud print of the printer 102A.

<2-6. Cloud Print Enabling Process Procedure>

Figure 18:
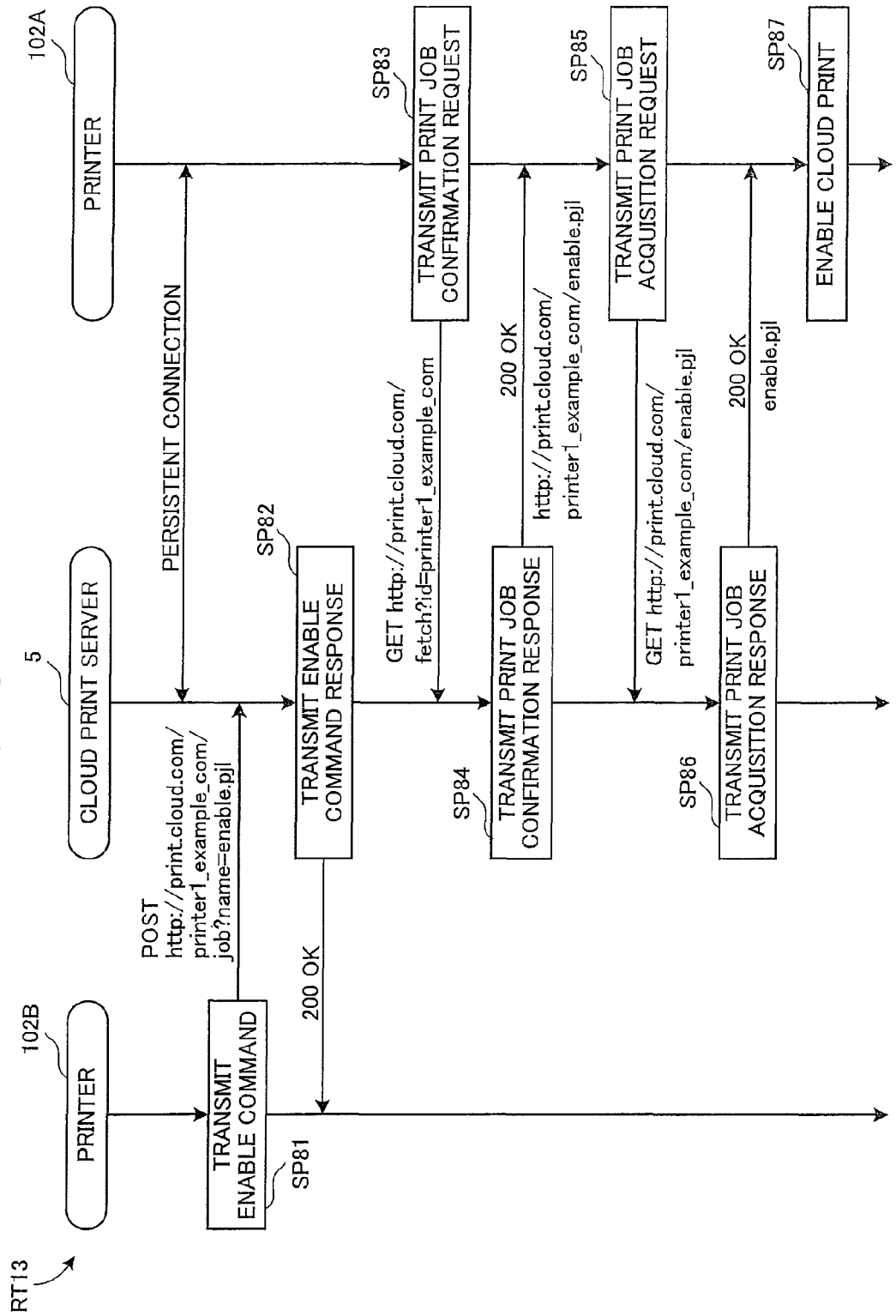
FIG. 18 is a sequence chart illustrating a print enabling process procedure.

Next, the cloud print enabling process procedure RT13 for the printer 102A by the cloud print system 101 will be described with reference to FIG. 18. It will be assumed that the printer ID for the printer 102A has been registered with the cloud print server 5 but no printer ID for the printer 102B has been registered with the cloud print server 5. It will also be assumed that there is a persistent connection between the print job reception controller 22A of the printer 102A and the controller 50 of the cloud print server 5, but the cloud print of the printer 102A has been disabled.

After the lapse of the validity period of the printer ID received from the user terminal 4, the controller 110B of the printer 102B deletes the printer ID for the printer 102A stored in the identification information storing area 40B and then transmits an enable command to the cloud print server 5 by the cloud print controller 36B.

Figure 20:
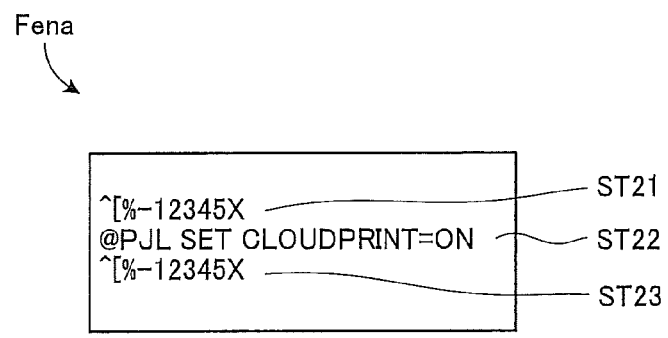
FIG. 20 illustrates an enable command file.

Specifically, the cloud print controller 36B transmits a POST command to "http://print.cloud.com/printer1_example_com/job?name=enable.pjl", which is a URL for transmission of print jobs for the printer 102A in the cloud print server 5 on the Internet NT. At this time, the cloud print controller 36B transmits an enable command file Fena having a file name "enable.pjl" shown in FIG. 20.

The enable command file Fena is in PJL format, and consists of a string ST22 and two strings ST21 and ST23 placed before and after the string ST22. The string ST22 is "@PJL SET CLOUDPRINT=ON", which indicates a command to enable the cloud print. Each of the strings ST21 and ST23 is "^[%-12345X", which is a UEL string indicating a delimiter of the command.

When the controller 50 of the cloud print server 5 receives the enable command file Fena, it stores the enable command file Fena in the print job queue for the printer 102A in the memory 52 and transmits an enable command response to the printer 102B in step SP82. Specifically, the controller 50 transmits a normal response "200 OK" to the printer 102B.

In step SP83, the controller 110A of the printer 102A transmits a print job confirmation request to the cloud print server 5 by the print job reception controller 22A. Specifically, the print job reception controller 22A transmits a GET command to "http://print.cloud.com/fetch?id=printer1_example_com", which is a URL of the print job queue for the printer 102A in the cloud print server 5 on the Internet NT.

When the controller 50 of the cloud print server 5 receives the print job confirmation request, it transmits a print job confirmation response to the printer 102A in step SP84. Specifically, the controller 50 transmits a normal response "200 OK" and "http://print.cloud.com/printer1_example_com/enable.pjl", which is a URL at which the enable command file Fena is stored, to the printer 102A.

Upon receiving the print job confirmation response, the print job reception controller 22A of the controller 110A of the printer 102A transmits a print job acquisition request to the cloud print server 5 in step SP85. Specifically, the print job reception controller 22A transmits a GET command to "http://print.cloud.com/printer1_example_com/enable.pjl".

Upon receiving the print job acquisition request, the controller 50 of the cloud print server 5 transmits a print job acquisition response to the printer 102A in step SP86. Specifically, the controller 50 transmits a normal response "200 OK" and the enable command file Fena with the file name "enable.pjl" to the printer 102A.

Upon receiving the print job acquisition response by the print job reception controller 22A, the controller 110A of the printer 102A enables the cloud print of the printer 102A by the cloud print controller 36A in step SP87.

As such, after the lapse of the validity period, the printer 102B transmits an enable command to the printer 102A via the cloud print server 5, thereby enabling the cloud print of the printer 102A. At this time, even when the cloud print is disabled, since there is a persistent connection between the cloud print server 5 and the printer 102A, the printer 102A can receive the enable command.

<2-7. Advantages>

In the cloud print system 1 in the first embodiment, when a user copies the printer ID for the printer 2A from the printer 2A to the user terminal 4, the persistent connection between the printer 2A and the cloud print server 5 is disconnected, and then, when a user gives the printer ID for the printer 2A to the printer 2B, a persistent connection is established between the printer 2B and the cloud print server 5.

Therefore, in the cloud print system 1, during the period from the disconnection of the persistent connection between the printer 2A and the cloud print server 5 until the establishment of the persistent connection between the printer 2B and the cloud print server 5, neither the printer 2A nor the printer 2B can print a print job for the printer to which the printer ID "printer1_example_com" is assigned.

Thus, when the printers 2A and 2B are apart from each other, if a user gives the printer ID to the printer 2B after moving from the location at which the printer 2A is placed to the location at which the printer 2B is placed, there is a possibility that neither the printer 2A nor the printer 2B can print a print job for the printer to which the printer ID "printer1_example_com" is assigned, during the movement of the user from the location at which the printer 2A is placed to the location at which the printer 2B is placed.

In contrast, the cloud print system 101 in this embodiment maintains the persistent connection between the printer 102A and the cloud print server 5 and, when the user terminal 4 gives the printer ID for the printer 102A to the printer 102B, transmits a disable command from the printer 102B to the printer 102A, thereby disabling the cloud print of the printer 102A.

Thus, during the movement of the user from the location at which the printer 2A is placed to the location at which the printer 2B is placed, the cloud print system 101 can print, by the printer 102A, a print job for the printer to which the printer ID "printer1_example_com" is assigned.

<3. Other Embodiments>

In the above identification information acquisition process procedure RT3 (FIG. 10) in the first embodiment, the persistent connection between the printer 2A and the cloud print server 5 may be disconnected at various timings after the printer 2A receives the printer ID acquisition request and before the printer 2A transmits the printer ID and validity period information.

In the above identification information acquisition process procedure RT3 (FIG. 10) in the first embodiment, the persistent connection between the printer 2A and the cloud print server 5 is disconnected. However, the persistent connection between the printer 2A and the cloud print server 5 may be maintained without being disconnected. In this case, although the cloud print server 5 perceives two printers including the printers 2A and 2B as the printer to which the printer ID "printer1_example_com" is assigned, at least one of the printers 2A and 2B can print a print job for the printer to which the printer ID "printer1_example_com" is assigned.

In the above identification information providing process procedure RT4 (FIG. 11) in the first embodiment, a persistent connection between the printer 2B and the cloud print server 5 may be established at various timings after the printer 2B receives the printer ID and validity period information and before the printer 2B transmits the normal response or before the printer 2B stores the printer ID and validity period information.

The above identification information acquisition process procedure RT3 (FIG. 10) and identification information providing process procedure RT4 (FIG. 11) in the first embodiment illustrates a case where the persistent connection between the printer 2A and the cloud print server 5 is disconnected, and then a persistent connection between the printer 2B and the cloud print server 5 is established. However, the printer 2A may disconnect the persistent connection with the cloud print server 5 after the lapse of a predetermined period of time from the transmission of the printer ID and validity period information to the user terminal 4 in step SP24, and the persistent connection between the printer 2A and the cloud print server 5 and the persistent connection between the printer 2B and the cloud print server 5 may exist simultaneously. Also in this case, although the cloud print server 5 perceives two printers including the printers 2A and 2B as the printer to which the printer ID "printer1_example_com" is assigned, at least one of the printers 2A and 2B can print a print job for the printer to which the printer ID "printer1_example_com" is assigned.

The above first embodiment illustrates a case where the printer 2A, printer 2B, and user terminal 4 are connected to each other via the Internet NT, the printer 2A provides the printer ID to the user terminal 4 via the Internet NT, and the user terminal 4 provides the printer ID and validity period information to the printer 2B via the Internet NT. However, the printer 2A, printer 2B, and user terminal 4 may be connected to each other via various communication means, such as USB (Universal Serial Bus) cable, an infrared communication link, and a wired or wireless communication link conforming to IEEE (Institute of Electrical and Electronics Engineers) 802.3u/ab, IEEE802.11a/b/g/n, or other standard, and the printer ID and validity period information may be provided via such various communication means. The same applies to the second embodiment.

The above embodiments illustrate the user terminal 4 as an identification information delivery device for delivering the printer ID from the printer 2A to the printer 2B, but another device such as a portable storage medium may be used. The portable storage medium includes a USB memory, a mobile phone, and various disks. For example, the printer ID may be delivered by the following steps of: connecting a portable storage medium with the printer 2A to store the printer ID for the printer 2A and the validity period information in the portable storage medium; and then connecting the portable storage medium with the printer 2B to provide the printer 2B with the printer ID for the printer 2A and the validity period information.

The above embodiments illustrate a case where the user terminal 4 is configured by a notebook PC, a mobile terminal, or the like, but the user terminal 4 may be various devices that are easy for a user to carry and transmit a print job to the cloud print server 5.

In the above embodiments, the user terminal 4 may transmit no print job to the cloud print server 5, and another device different from the user terminal 4 may transmit a print job to the cloud print server 5.

In the above embodiments, after the printer ID has been provided to the printer 2B or 102B, the printer ID may be deleted from the memory 62 in the user terminal 4 based on the control of the controller 60 or a command from the printer 2B or 102B. Alternatively, when the printer 2A or 102A provides the printer ID to the user terminal 4, the printer ID may be appended with information indicating an instruction to automatically delete the printer ID after the lapse of a predetermined period of time.

The above first embodiment illustrates a case where the printer ID issued by the cloud print server 5 is used as the identification information for identifying the printer 2A, but a unique identification information, such as a MAC (Media Access Control) address, included in the printer 2A may be used as the identification information. For example, the printer 2A may transmit a printer ID for the printer 2A stored in advance in the memory 12A to the cloud print server 5; the cloud print server 5 may receive the printer ID transmitted from the printer 2A and store the received printer ID in the memory 52 to register the printer 2A with the cloud print server 5. The same applies to the second embodiment.

The above second embodiment illustrates a case where the printer 102B automatically transmits a disable command to the printer 102A when obtaining the printer ID from the user terminal 4, and automatically transmits an enable command to the printer 102A when the validity period has elapsed. However, the disable command and enable command may be transmitted to the printer 102A based on user's operation. Alternatively, after the lapse of the validity period, before the receipt of an enable command, the printer 102A may enable the cloud print by its own process or determination.

The above embodiments illustrate a case where, upon receiving a printer ID acquisition request, the controller 10A or 110A of the printer 2A or 102A sets the validity period. However, for example, the controller 50 of the cloud print server 5 may set the validity period when issuing the printer ID or based on user's operation.

The above embodiments illustrate a case where the identification information storing area 40B of the printer 2B or 102B stores only the printer ID for the printer 2A or 102A, but the identification information storing area 40B may store a printer ID (e.g., "printer2_example_com") for the printer 2B or 102B in addition to the printer ID for the printer 2A or 102A.

The above embodiments illustrate a case where the printer 2A or 102A temporarily provides the printer 2B or 102B with the printer ID, thereby allowing the printer 2B or 102B to perform substitute printing. However, the printer 2B or 102B may temporarily provide the printer 2A or 102A with a printer ID for the printer 2B or 102B, thereby allowing the printer 2A or 102A to perform substitute printing.

The above embodiments illustrate a case where the two printers 2 are connected to the Internet NT (or cloud print server 5), but three or more printers may be connected to the Internet NT (or cloud print server 5).

The above embodiments illustrate a case where the printer 2A or 102A, printer 2B or 102B, user terminal 4, and cloud print server 5 are connected with each other via the Internet NT, but they may be connected via various communication means, such as USB cable, and a wired or wireless LAN conforming to IEEE 802.3u/ab, IEEE802.11a/b/g/n, or other standard.

The above embodiments illustrate a case where the present invention is applied to the cloud print system 1 or 101 that prints, at the printer 2 or 102, a print job transmitted from the user terminal 4 via the Internet NT to the cloud print server 5. However, the invention may be applied to other systems, such as a system in which a predetermined device downloads, from a server, various content data transmitted from a client via the Internet NT to the server.

The above embodiments illustrate a case where the present invention is applied to the printer, but the invention may be applied to other various devices, such as a copier, a multifunction peripheral, and a facsimile machine. The invention is also applicable to various electronic devices that perform processing regarding an image, such as a computer that causes a printer to print an image, an image scanner, a facsimile machine, and a copier.

The first embodiment illustrates the cloud print system 1 as an image forming system including: the cloud print server 5 as a server having the memory 52 as a first memory, the registration unit 71, the job obtaining unit 72, and the job transmission unit 73; the printer 2A as a first image forming apparatus having the identification information storing area 40A as a second memory, the print job reception controller 22A as a first job reception unit, the identification information output controller 28 as an identification information output unit, and the validity period monitoring unit 30A as a second restriction unit; and the printer 2B as a second image forming apparatus having the identification information obtaining controller 34 as an identification information obtaining unit, the print job reception controller 22B as a second job reception unit, and the validity period monitoring unit 30B as a first restriction unit.

The second embodiment illustrates the cloud print system 101 as an image forming system including: the cloud print server 5; the printer 102A as a first image forming apparatus having the cloud print controller 36A as a command reception unit; and the printer 102B as a second image forming apparatus having the cloud print controller 36B as a command transmission unit.

The above embodiments illustrate the printer 2B (or 102B) as an image forming apparatus including: the identification information obtaining controller 34 as an identification information obtaining unit; the print job reception controller 22B as a job reception unit, and the validity period monitoring unit 30B as a restriction unit.

While the preferred embodiments of the present invention have been illustrated in detail, it should be apparent that modifications and improvements may be made to the invention without departing from the spirit and scope of the invention as described in the following claims.

What is claimed is:

1. An image forming system comprising:
a server;
a first image forming apparatus; and
a second image forming apparatus,
wherein the server includes:
a first memory;
a registration unit that registers the first image forming apparatus with the server by storing identification information for identifying the first image forming apparatus in the first memory;
a job obtaining unit that obtains a print job for the first image forming apparatus; and
a job transmission unit that, upon receiving a request including the identification information stored in the first memory, transmits the print job obtained by the job obtaining unit to a source of the request,
wherein the first image forming apparatus includes:
a second memory that stores the identification information for identifying the first image forming apparatus; and
a first job reception unit that transmits the request including the identification information stored in the second memory to the server and receives the print job transmitted from the server in response to the request, and
wherein the second image forming apparatus includes:
an identification information obtaining unit that obtains the identification information for identifying the first image forming apparatus; and
a second job reception unit that transmits the request including the identification information obtained by the identification information obtaining unit to the server and receives the print job transmitted from the server in response to the request.

2. The image forming system of claim 1, wherein the job obtaining unit, upon receiving designation of the first image forming apparatus registered with the server and image data, generates a print job for the designated first image forming apparatus including the designated image data, and
wherein the job transmission unit transmits the generated print job as the obtained print job.

3. The image forming system of claim 2, further comprising a client including a designation unit that designates the first image forming apparatus registered with the server and image data,
wherein the job obtaining unit receives the designation from the designation unit.

4. The image forming system of claim 1, wherein the first image forming apparatus further includes an identification information output unit that outputs the identification information stored in the second memory to the outside of the first image forming apparatus, and
wherein the identification information obtaining unit obtains the identification information output by the identification information output unit.

5. The image forming system of claim 4, wherein the identification information output unit outputs the identification information with validity period information indicating a validity period,
wherein the identification information obtaining unit obtains the identification information with the validity period information, and
wherein the second image forming apparatus further includes a first restriction unit that restricts the reception of the print job by the second job reception unit after the lapse of the validity period indicated by the validity period information.

6. The image forming system of claim 5, wherein the first restriction unit deletes the identification information obtained by the identification information obtaining unit after the lapse of the validity period.

7. The image forming system of claim 5, wherein the first image forming apparatus further includes a second restriction unit that restricts the reception of the print job by the first job reception unit after the output of the identification information by the identification information output unit, and removes the restriction of the reception of the print job by the first job reception unit after the lapse of the validity period.

8. The image forming system of claim 4, wherein the second image forming apparatus further includes a command transmission unit that transmits a command to the first image forming apparatus when the identification information obtaining unit obtains the identification information, and
wherein the first image forming apparatus further includes a command reception unit that, upon receiving the command from the command transmission unit, restricts the reception of the print job by the first job reception unit.

9. The image forming system of claim 5, wherein the second image forming apparatus further includes a command transmission unit that transmits a command to the first image forming apparatus after the lapse of the validity period indicated by the validity period information obtained by the identification information obtaining unit, and
wherein the first image forming apparatus further includes a command reception unit that, upon receiving the command from the command transmission unit when the reception of the print job by the first job reception unit is restricted, removes the restriction of the reception of the print job by the first job reception unit.

10. The image forming system of claim 1, wherein the registration unit, upon receiving a request to register the first image forming apparatus, generates identification information for identifying the first image forming apparatus, stores the generated identification information in the first memory to register the first image forming apparatus with the server, and transmits the generated identification information to the first image forming apparatus, and
wherein the first image forming apparatus receives the identification information from the registration unit and stores the received identification information in the second memory.

11. The image forming system of claim 1, wherein the first image forming apparatus transmits the identification information stored in the second memory to the server, and
wherein the registration unit receives the identification information transmitted from the first image forming apparatus, and stores the received identification information in the first memory to register the first image forming apparatus with the server.

* * * * *